US008325656B2

(12) United States Patent
Lindskog et al.

(10) Patent No.: US 8,325,656 B2
(45) Date of Patent: Dec. 4, 2012

(54) ARRANGEMENT AND METHOD FOR EXTENDED CONTROL PLANE SIGNALLING IN A HIGH SPEED PACKET DATA COMMUNICATION

(75) Inventors: Jan Lindskog, Pixbo (SE); Anders Andersson, Kungälv (SE); Roger Wallerius, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1048 days.

(21) Appl. No.: 12/278,670

(22) PCT Filed: Feb. 7, 2006

(86) PCT No.: PCT/SE2006/000163
§ 371 (c)(1),
(2), (4) Date: Aug. 7, 2008

(87) PCT Pub. No.: WO2007/091924
PCT Pub. Date: Aug. 16, 2007

(65) Prior Publication Data
US 2009/0034466 A1 Feb. 5, 2009

(51) Int. Cl.
*H04W 4/00* (2009.01)
*H04L 12/66* (2006.01)
*H04J 3/16* (2006.01)
(52) U.S. Cl. .......................... 370/329; 370/468; 370/352
(58) Field of Classification Search .................. 714/751,
714/748, 750; 370/235, 329, 338, 331, 412,
370/410; 455/69, 436, 437, 522, 435
See application file for complete search history.

(56) References Cited

U.S. PATENT DOCUMENTS

| 7,054,633 | B2 | 5/2006 | Seo et al. |
| 7,286,563 | B2* | 10/2007 | Chang et al. ................. 370/469 |
| 7,535,886 | B2* | 5/2009 | Lee et al. ..................... 370/348 |
| 7,783,949 | B2* | 8/2010 | Lohr et al. .................... 714/751 |
| 7,839,892 | B2* | 11/2010 | Eckert et al. .................. 370/469 |
| 7,907,570 | B2* | 3/2011 | Hwang ......................... 455/522 |
| 7,940,663 | B2* | 5/2011 | Kadous ......................... 370/235 |
| 7,949,001 | B2* | 5/2011 | Yi et al. ........................ 370/412 |
| 2005/0047416 | A1* | 3/2005 | Heo et al. .................... 370/395.4 |
| 2008/0137564 | A1* | 6/2008 | Herrmann ..................... 370/310 |

FOREIGN PATENT DOCUMENTS

EP 1341336 A1 9/2003
* cited by examiner

*Primary Examiner* — Hanh Nguyen

(57) ABSTRACT

The present invention relates to a base station arrangement (20) in a communications system supporting high speed packet data communication, comprising a base station protocol entity for a protocol handling high speed control signalling and physical resource allocation for high speed data communication, quality handling means (27) adapted to receive and handle channel condition related information from mobile user stations, encoding means for encoding data packets to be transmitted to mobile user station, and transmission control means comprising a scheduling means (28) communicating with a hybrid automatic retransmission system (HARQ) ($22_1, \ldots, 22_n$) and being adapted to control transmission of data packets using said channel condition related information and data packet buffering means ($23_1, \ldots, 23_n$). The base station protocol entity further comprises a control plane entity supporting an extended control plane for control plane signalling messages comprising specific control messages handling means (26), adapted to provide a specific probing or information control message and to send said message to a mobile user station.

25 Claims, 16 Drawing Sheets

ARRANGEMENT AND METHOD FOR EXTENDED CONTROL PLANE SIGNALLING IN A HIGH SPEED PACKET DATA COMMUNICATION

FIELD OF THE INVENTION

The present invention relates to a base station arrangement in a communication system supporting high speed packet data communication. It comprises a base station protocol entity for a protocol for communication with mobile user stations, which protocol handles high speed control signalling and physical resource allocation for high speed data communication, and quality handling means adapted to receive and handle channel condition related information from mobile user stations, encoding means for encoding data packets to be transmitted to mobile user stations and transmission control means comprising a scheduling means communicating with a hybrid automatic retransmission system and being adapted to control transmission of data packets based on, or using, said channel condition related information, and data packet buffering means.

The invention also relates to a mobile user station supporting high speed packet data communication and comprising a mobile user station protocol entity for a protocol for communication with a base station (as referred to above), which protocol handles high speed control signalling and physical resource allocation for high speed data communication. The entity comprises a hybrid automatic retransmission mechanism comprising a number of processes, reordering handling means with a number of reordering buffers adapted to route, over the protocol received, protocol data units to the appropriate buffer based on a queue identity to reorder protocol data units in an appropriate sequence, and an automatic repeat requesting functionality.

The invention also relates to a method in a base station arrangement as referred to above, and also particularly to a method in a mobile user station.

STATE OF THE ART

In UMTS (Universal Mobile Telecommunication System) a new protocol has been introduced in HSDPA (High Speed Downlink Packet Access) which is called the MAC-hs protocol (Medium Access Control-high speed). It is described in 3GPP TS 25.321, which generally describes the MAC behaviour, and 3GPP TS 25.211 which basically describes how information from the MAC-layers is mapped onto the channel sent out on the air. This protocol is introduced in Node-B, which is a base station arrangement, and the UE (User Equipment) of the UMTS system. The protocol includes a so called fast hybrid automatic retransmission (HARQ) mechanism. The HARQ mechanism serves the purpose of lowering latency and increasing throughput. Node-B and a specific UE can have several simultaneous outstanding packets for transmission. Each transmitted packet is assigned a HARQ process by Node-B in both the Node-B and the UE. Which HARQ process that is assigned is signalled from Node-B to the UE on the downlink HS-SCCH (High Speed Shared Channel Control Channel). HS-PDSCH (High Speed Packet Downlink Shared Channel) is the actual packet carrier and it is sent two time slots or $2\times(1/15)10=1,3333$ ms later. This signalling is performed for each transmission, and for each transmission attempt, the UE should respond with a positive acknowledgement (ACK) if the packet was successfully decoded and a negative acknowledgement (NACK) if the packet was detected and received, but not successfully decoded. This information is signalled on the uplink HS-DPCCH physical channel (Dedicated Physical Control Channel). The reason for having multiple HARQ processes is that the round trip time in relative terms is long so that if only one HARQ process were available, the quotient (the total transmission time)/(the total connection time) would be low. Thus, whereas one process awaits a response, another HARQ process, or multiple HARQ processes transmit(s), which means that total transmission time/total connection time can be up to 100%.

It is not signalled in HS-DPCCH to which HARQ process an ACK/NACK was aimed, but there is a constant time delay between downlink HS-SCCH transmission and corresponding uplink HS-DPCCH transmission. Thus Node-B can determine which HARQ process was aimed with each ACK/NACK transmission by means of measuring the time elapsed from the point where the HS-SCCH transmission was done. If however the UE does not detect the packet sent from Node-B, for example due to the UE not having detected the HS-SCCH transmission, it is unaware that the transmission has taken place and will consequently neither send ACK nor NACK on the HS-DPCCH. On the receiving side in a Node-B this is observed as a discontinuous transmission (DTX), i.e. neither an ACK nor a NACK should be detected on the receiving side.

Node-B buffers incoming downlink end user data and utilizes an internal scheduling entity to determine when to transmit buffered data. To assist in the scheduling decision, Node-B continuously receives channel quality estimates from the UE entities and Node-B also also has knowledge about UE receiver capabilities. At a pace of up to 500 times per second, Node-B transmits MAC-hs PDUs (Protocol Data Unit) to the UEs. At each 2 ms transmit opportunity Node-B can vary the MAC-hs PDU size depending on buffered amount of data, channel quality estimates, UE capabilities and the amount of downlink codes available. Thus, for each MAC-hs entity, data to 1 UE up to 4 UEs can be scheduled at each 2 ms transmit opportunity utilising code division among the scheduled UEs.

The UE decodes a HSDPA control channel, denoted HS-SCCH, and upon a successful CRC (Cyclic Redundancy Check) checksum, the UE continues to decode the HSDPA packet data channel, denoted HS-PDSCH, High Speed Physical Downlink Shared Channel. Depending on the outcome of the HS-SCCH and HS-PDSCH decoding, the UE transmits a reception feedback back to the peer Node-B, which is interpreted by a Node-B sender, and upon a negative feedback, or absence of feedback, indicating a reception failure for the UE, Node-B retransmits the data.

To be more precise, NACK indicates a successful reception of HS-SCCH, but failure to receive HS-PDSCH and DTX indicates an unsuccessful reception of HS-SCCH.

MAC-hs PDUs are numbered by modulo TSN (Transport Sequence Number) cycling through the field 0 to 63. The MAC-hs protocol is semi-reliable which means that the MAC-hs entity on the transmitting side can discard MAC-hs PDUs which have been transmitted and possibly retransmitted one or several times to the MAC-hs entity on the receiving side. The reason for discarding a MAC-hs PDU is to prevent unnecessary retransmissions over the radio link e.g. if the MAC-hs receiver has moved to another cell or has powered down or for any other reason is not capable to receive data. This can be done either at a predetermined time after a first transmission or at a maximum number of retransmissions or at a combination of both these factors, at unsufficient downlink power, unsatisfactory CQI from UE or other factors.

The MAC-hs receiver utilizes a receiver window with the purpose to mitigate the effect when PDUs are received in non-ascending sequence order, which can occur due to retransmissions. Whenever a MAC-hs PDU is successfully decoded with TSN equal to the next expected TSN, the receiver can deliver PDUs to the RLC (Radio Link Control) layer, i.e. to the higher layers. Depending on whether the subsequent TSN number (i.e. the next expected TSN+1) is already successfully decoded, that MAC-hs PDU can also be delivered and so on. The receiver window is updated accordingly. Delivery to the RLC layer from the MAC-hs protocol is done in ascending TSN sequence order.

However, in order to recover from a situation where for example the sender has discarded a MAC-hs PDU, the receiver utilizes two mechanisms to solve the problem. One of the mechanisms is a timer based stall avoidance which is a mechanism which works such that at the reception of a PDU with TSN exceeding the next expected TSN, the receiver starts a timer (denoted T1). When the timer expires, the receiver takes the appropriate actions to allow for subsequent PDUs to be received. This is described in 3GPP TS 25.321, chapter 11.6.2.3.2. It also uses a window based stall avoidance mechanism. Upon reception of a PDU with TSN outside the receiver window, the receiver shall shift its upper window edge to include the received TSN. "Next expected TSN" shall be updated and all previous PDUs stored in the window that now fall outside the window shall be delivered to the RLC layer. The above two mechanisms are examples of HSDPA exception handling in the UE.

A UE ID (RNTI, Radio Network Temporary Identifier,) that identifies the UE for which the HS-SCCH information is intended is used as a scrambling of the HS-SCCH. When coding the HS-SCCH in Node-B, the UE ID is included using a CRC mechanism. The exact details are given in 3GPP 25.212. Upon reception of a HS-SCCH, a UE utilizes its ID to descramble the HS-SCCH to check whether HSDPA data is destined to the UE, i.e. if the HS-SCCH is successfully decoded. The HS-SCCH contains Transport-Format and Resource-related-Information (TFRI) and HARQ related information such as HARQ process number, redundancy version and a New-Data-Indicator (NDI).

As referred to above the UE constantly transmits information to Node-B regarding channel conditions, CQI. Using CQI, Node-B can determine what modulation rate to use and the amount of data to transmit. It is however likely that Node-B implements an internal algorithm with the purpose to improve the CQI given from the UE. Typically the internal algorithm will utilize the outcome from the MAC-hs transmissions occurring to get a result from real or actual transmissions in combination with the received CQI.

Depending on algorithm and on traffic condition, the internal algorithm may predict an incorrect improved CQI during a start up phase, or if no internal algorithm is used, the UE may have an error when estimating CQI. Both these conditions would affect throughput and latency for the end user throughput. A traffic condition when it may be disturbing with an incorrect estimation of CQI is during the start up phase or situations when an end user transmits a small amount of data only, such as voice-over-IP. For voice over IP (VoIP) a low latency is very important.

For a Node-B implementation where an internal algorithm to improve the CQI information received from the UE is used, that algorithm typically utilises information from real MAC-hs transmissions. Since MAC-hs transmission is scheduled when pending MAC-d data exists to be sent to the UE, the algorithm can only be updated when Node-B receives MAC-d data from the RNC (Radio Network Controller). There exists no mechanism to internally generate data for MAC-hs transmissions in Node-B.

A problem that can arise with incorrect CQI estimation in Node-B is if a UE correctly receives a MAC-hs transmission and acknowledges the reception up to Node-B, but due to reception errors, Node-B may fail to decode the information. Node-B will then retransmit the MAC-hs data again. The MAC-hs protocol is robust against this kind of error but it adds unnecessary delay.

Another problem that can occur is when Node-B discards the latest MAC-hs PDU (highest TSN). Then there will be a difference between Node-B "next transmitted TSN" and the "next expected TSN" in the UE. This may have as a consequence that when the next accessful transmission occurs, the UE will start an exceptional recovery procedure (e.g. time based stall avoidance) which will take additional time. It is also a problem that there is no possibility for a base station arrangement, for example Node-B to, in a simple way, check the long term or statistical reception status from a UE today and to appropriately control transmissions, and have sufficient information about the mobile user station reception capabilities.

Node-B has no means to explicitly force a reset of the MAC-hs of the UE.

SUMMARY OF THE INVENTION

What is needed is therefore a base station arrangement as initially referred to which is able to get some desired information from a mobile user station and/or to provide some information to a mobile user station, most particularly at any desired time. Particularly a base station arrangement is needed which is able to get correct information about reception status of a mobile user station. A base station arrangement is also needed which is able to receive or request information or to check reception status whenever it is wanted to. Particularly a possibility to provide information or instructions etc. from a base station arrangement to a mobile user station is also needed, even more particularly at any time. A base station arrangement is also needed which better or easier or when wanted to can obtain and/or request appropriate information, for example regarding channel conditions to determine more accurately what modulation rate to use and the amount of data to transmit etc. to a mobile user station.

A base station arrangement is also needed through which one or more of the problems discussed in the previous part of the description can be solved. Particularly a base station arrangement is needed through which throughput and latency for an end user can be improved. Moreover a base station arrangement is needed which has an increased communication possibility or additional communication possibility with a mobile user station, or even a control possibility. Particularly a base station arrangement is needed through which it is enabled that a correct estimation of CQI during a start up phase, and also when an end user transmits a small amount of data, for example voice over IP, can be provided. A base station arrangement is also needed through which unnecessary transmissions of high speed protocol data units can be avoided but also that they can be transmitted when actually needed, and that no unnecessary recovery procedures are initiated, or, vice versa are not initated when they are due.

Particularly a base station arrangement is needed which better and/or to a higher extent or than hitherto can provide/ get information to/from a mobile user station.

A base station arrangement is also needed which enables coherency between information in a base station and a mobile user station about which is the transmitted TSN or next expected TSN, i.e. that information is consistent at substantially all times in the base station arrangement and in a mobile user station. Even more particularly a base station arrangement is needed which is able to control and verify actions of a mobile user station and receive appropriate acknowledgement from a mobile user station.

A mobile user station as initially referred to is also needed through which one or more of the above mentioned objects can be achieved. Still further methods, in a base station arrangement as well as in a mobile user station, and in communication between the two of them, are needed through which one or more of the above mentioned objects can be achieved.

Therefore a base station arrangement as initially referred to is provided wherein the base station protocol entity further comprises a control plane entity supporting an extended or adapted (updated) control plane for control plane signalling messages, which comprises specific control message handling means adapted to provide a specific probing or information control message and to send said message to a mobile user station.

It may further comprise interpreting decoding means adapted to interpret a direct or indirect response reaction to a specific information control message from a mobile user station, although in some implementations such means are not provided.

Preferably it comprises or communicates with a radio base station, even more particularly it comprises a Node-B of a e.g. UMTS system.

In advantageous implementations a specific information control message indication is provided in a header of a protocol data unit of the high speed protocol, the specific control message being provided in the payload of said protocol data unit. In one embodiment the specific probing of information control message indication comprises an indication or a figure (number), e.g. 1, 2, etc. in the version flag field of the protocol data unit header. Generally the protocol data unit header further comprises a queue identifying field and an identity given in said queue identifying field may indicate a specific data packet queue to which the specific control message refers. Particularly the protocol data unit header further comprises a size index identifying field and said size index identifying field is used for setting a default value for specific probing or information control messages or to indicate the size of the specific control message or, alternatively it is not used.

In alternative embodiments a specific size identifying value is used in a size index identifying field of the header to indicate a specific information control message, other fields of the header preferably being unaffected, i.e. normally operating.

In a particularly advantageous embodiment the header of a protocol data unit is used to provide an indication of a specific control message, by setting the version flag field to zero, i.e. VF=0, using only one size index identifying field (SID) and setting a field in the header identifying the number of consecutive packet data units to zero, (N=0), and indicating that there is only one set or triplet with fields identifying size index, number of consecutive fields (0) and indication if there are no more fields in the header (set to indicate that there are more fields in the header, then normally set to 1). Then, in a particular implementation, the payload only comprises MAC-hs payload, i.e. a specific control message and no padding. In another implementation, the whole information field (payload) only contains padding, hence in this way forming a probing or "null" data message.

In some implementations the specific information control message comprises a null data message. As discussed above, this can be provided for in different manners. Said null data message may e.g. be set where there is no VoIP data in the buffering means and a queue has been set up for VoIP transmission. Of course null data messages may also be sent as specific control messages for other reasons, e.g. to check the reception status.

In alternative embodiments a specific probing or information control message may comprise a statistic reset message instructing reset of statistical information, or a reset message requesting reset of all the high speed packet data units of a specific receiver queue. It may also be a status request message. If response reactions are implemented the response reaction may be indirect and comprise an acknowledgement or a non-acknowledgement. Particularly may then an acknowledgement or a non-acknowledgement of another action e.g. sent for another purpose, or a "conventional" ACK/NACK be used or interpreted as an acknowledgement or non-acknowledgement of the reception of a specific probing or information control message.

Alternatively the response reaction is direct and particularly also comprises a verification that a specific action has been performed and optionally additional information.

Particularly the protocol comprises the MAC-hs protocol of HSDPA. The protocol data unit then particularly comprises a MAC-hs PDU comprising a MAC-hs header and payload including a number of MAC-d PDUs.

Furthermore a mobile user station as initially referred to is provided wherein the mobile user station protocol entity comprises a control plane entity supporting an extended or adapted (updated) control plane for control plane signalling comprising specific control message handling means for handling specific probing or information control messages from a base station arrangement.

In some implementations it further comprises feedback providing means adapted to act also as means for generating a direct or indirect reaction to a received specific probing or information control message. Particularly it comprises an UE e.g. supporting UMTS or similar.

The specific control message handling means particularly comprises analyzing means for analyzing a protocol data unit received from a base station and for establishing whether it comprises or contains a specific probing or information control message. The analyzing means are even more particularly adapted to interpret the specific probing or information control message. Preferably a specific probing or information control message indication is provided in the header of a protocol data unit of the high speed protocol.

In a particular implementation the specific probing or information control message indication comprises an indication or a figure (number), e.g. 1, 2, etc. in the version flag field of the header. The header further comprises a queue identifying field and then in an identity given in said queue identifying field indicates a specific data packet queue to which the specific probing or information control message refers and the analyzing means are further adapted to determine the affected queue identity and to interpret the specific probing or information control message.

Alternatively the specific probing or information control message indication is provided by means of a size index identifying field of the packet data unit header. Particularly the analyzing means are adapted to analyze the protocol data unit header before or after the received protocol data unit has been appropriately reordered in the reordering means depending on queue identity. The analyzing means are particularly adapted to determine of which of a number of different types the specific probing or information control message consists.

In another particular embodiment a specific probing or information control message indication is provided by means of indicating version field=0, and using only one set of fields in the header identifying field size (SID), number of consecutive packet data units with equal size (N=0) and additional fields in the header (F) and either using the whole payload field for (MAC-hs) specific control data or only for padding (i.e. corresponding to "null" data).

The specific probing or information control message may in the various implementations comprise a probing message e.g. a null data message, and the analyzing means are adapted to discard the null data message. The specific probing or information control message may alternatively comprise a statistic reset message and the analyzing means are adapted to fetch received statistic information and to transmit such information to the base station arrangement and to reset a receive statistic functionality.

Still further the specific probing or information control message may comprise a reset message and the analyzing means are adapted to reset the protocol data unit. Still further it may comprise a status request message, or other kind of specific control data message.

Particularly the mobile user station is specifically adapted to handle MAC-hs PDUs comprising said specific probing or information control message.

Still further a method for exchanging information, e.g. channel condition or reception status related information of a mobile user station between a base station arrangement and a mobile user station, or providing information to a mobile user station, in a communication system supporting high speed packet data communication over a high speed signalling protocol between the base station arrangement and the mobile user station, is provided.

It comprises the steps of;
sending a specific probing or information control message over the high speed signalling protocol extended or adapted (updated) to support sending of such messages from the base station arrangement to a mobile user station,
establish in the mobile user station if a specific probing or information control message indication is included in a high speed protocol data unit header or in its payload; if yes, interpreting the specific probing or information control message in the mobile user station, such that the base station arrangement can obtain information, take a relevant action or make the mobile user station take a relevant action or provide the mobile user station with information at substantially any time.

Advantageously the method further comprises the step of:
directly or indirectly providing a response reaction to the base station arrangement from the mobile user station to the base station arrangement, before or after the step(s) of establishing existence of a specific probing or information control message and for interpreting a specific probing or information control message.

Particularly it comprises the step of:
Providing the specific probing or information control message indication in the header of a high speed protocol data unit, as an indication in a version flag field or as an indication in a size index identifying field, or as an indication in a version flag field and containing only one set of fields indicating size, and number of consecutive packet data units of the same size and further fields in the header. Then there is in one embodiment only padding in the payload (corresponding to a null data, probing message), or, in another embodiment, only a specific control message (no padding) in the payload.

In a particular embodiment the specific probing or information control message comprises a null data message. Alternatively the specific probing or information control message comprises a reset message instructing reset of statistical information or a protocol data unit reset message or a status request message. Particularly the protocol data unit comprises a MAC-hs PDU.

In a most particular implementation a Channel Quality Indicator (CQI) field is used as a response reaction channel from the mobile user station to the base station arrangement. The response reaction may comprise an acknowledgement/non-acknowledgement provided as an indirect response to reception of the specific probing or information control message by confirming/denying an action concerning a packet containing the specific probing or information control message or as an existing response confirming/denying correct reception of a protocol data unit comprising such specific probing or information control message.

Most particularly the method comprises the steps of, in a radio base station arrangement;
establishing if a HARQ process is terminated for a mobile user station; if yes;
establishing if any other HARQ process is active for that mobile user station, if not;
establishing if an acknowledgement concerning the terminated HARQ process has been received from the mobile user station, if not;
establishing if there are any high speed protocol data units on a buffer intended for the mobile user station, if not;
transmitting the specific probing or information control message to the mobile user station.

Therefore a method in mobile user station supporting high speed packet data communication and implementing a hybrid automatic retransmission mechanism, with a number of HARQ processes, and a reordering queue mechanism is also provided which comprises the steps of;
verifying if a received high speed control channel protocol data unit is successfully decoded; if yes;
verifying if a HARQ process is successfully decoded, if yes, the method comprises the steps of:
establishing if a specific probing or information control message indication is contained in the protocol data unit header or its payload;
interpreting the specific probing or information control message.

Particularly the protocol data unit comprises a MAC-hs PDU and a specific probing or information control message indication is provided in or by the MAC-hs PDU header, e.g. in a version field or a size indication field, and/or a field containing information about possible subsequent fields in the header or number of consecutive packet data units of the same size, e.g. MAC-d PDUs.

Most particularly the specific probing or information control message comprises a null data message or a statistic reset message or a MAC-hs PDU reset message or a status request message.

In an advantageous implementation the method further comprises the step of;
providing a response reaction to the base station arrangement directly or indirectly.

Advantageous embodiments or implementations are given by the respective appended subclaims.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
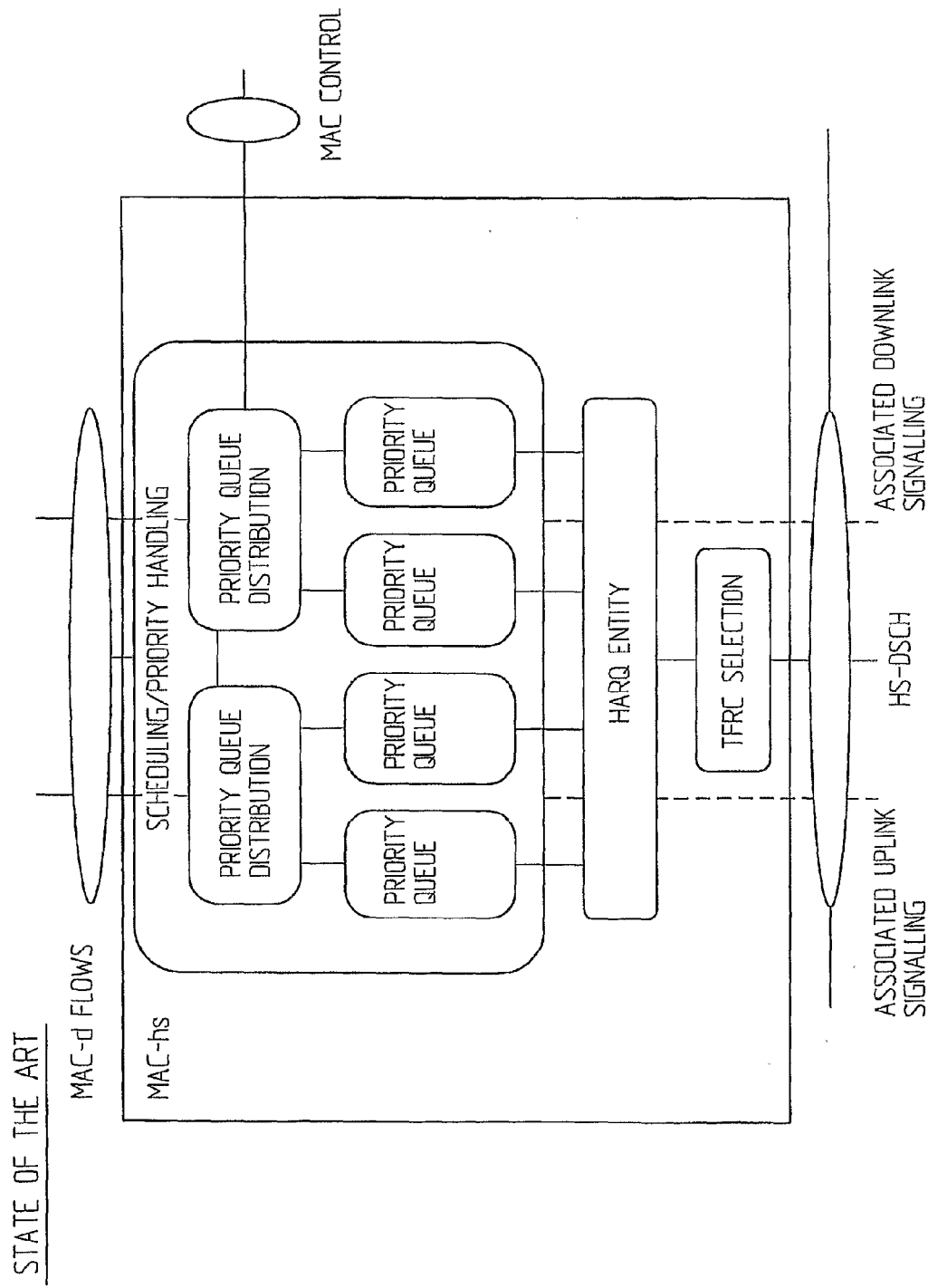
FIG. 1 shows a state of the art block diagram of the MAC architecture with MAC-hs details on the UTRAN side.

For explanatory and exemplifying reasons a base station protocol entity, here comprising a MAC-hs entity in a base station arrangement, here on the UTRAN side, or in Node-B, will be described with reference to FIG. 1. Generally there is one MAC-hs entity in the UTRAN for each cell supporting HS-DSCH transmission. This is particularly described in 3GPP TS 25.321 chapters 4.2.4.3 and 4.2.3.3. The MAC-hs is responsible for handling the data transmitted on the HS-DSCH and for management of the physical resources allocated to HSDPA. MAC-hs receives configuration parameters from the RRC layer via the MAC control SAP and there should be priority handling per MAC-d PDU flow in a MAC-hs. A MAC-hs comprises four different functional entities. One of these entities is the flow control entity which is the companion flow control function to the flow control function in the MAC-c/sh/m which will not be further explained herein. This function is intended to limit MAC layer 2 signalling latency and reduce discarded and retransmitted data as a result of HS-DSCH congestion. Flow control is provided independently by MAC-d flow for a given MAC-hs entity. It further comprises an entity scheduling/priority handling means which is a function managing HS-DSCH resources between HARQ entities and data flows according to their priority. Based on status reports from associated uplink signalling either new transmission or retransmission is determined. Further it determines the queue ID and TSN for each new MAC-hs PDU being serviced and in case of TDD (Time Division Duplex) the HCSN (HS-SCCH Cyclic Sequence Number) is determined. A new transmission can be initiated instead of a pending retransmission at any time to support the priority handling.

Hence, a HARQ process sending a MAC-hs PDU waits for an ACK (possibly it resends the MAC-hs PDU at NACK/DTX etc., but it is proceeded with the NACK process before it gets new data). A HARQ process may however be resting if it has received a NACK until it performs a retransmission if it has not got a retransmission priority.

Still another entity is the HARQ entity which handles the hybrid ARQ functionality for one user. One HARQ entity is capable of supporting multiple instances (HARQ process) of stop and wait HARQ protocols. There should be one HARQ process per HS-DSCH per TTI. In other words, if there is a transmission, then a HARQ process is involved, but there does not have to be a transmission, e.g. if there is no power left for HSDPA compared with normal speed traffic. Furthermore it comprises a function denoted TRFC selection which handles selection of an appropriate transport format and resource for the data to be transmitted on HS-DSCH.

Figure 2:
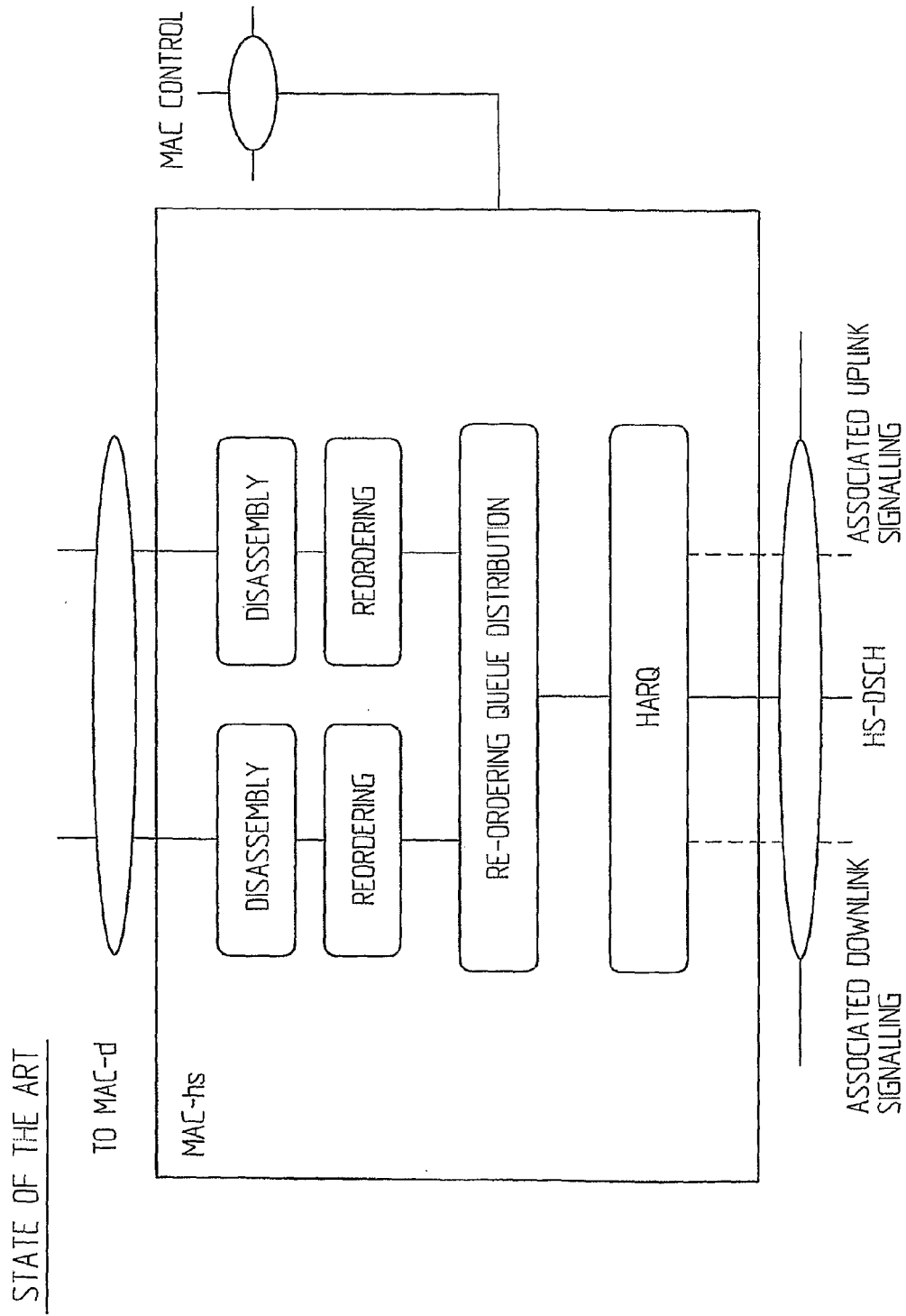
FIG. 2 is a block diagram illustrating the MAC-hs details for a MAC architecture on the UE side.

FIG. 2 similarly schematically illustrates a MAC-hs entity on the UE side. The MAC-hs handles the HSDPA specific functions and particularly comprises a HARQ entity which is responsible for handling the MAC functions relating to the HARQ protocol. The HARQ functional entity handles all the tasks that are required for hybrid ARQ. It is responsible for generating acknowledgements or NACKs. Another entity is the reordering queue distribution entity which is a function that routes MAC-hs PDUs to the correct reordering buffer based on the queue ID of the MAC-PDU. The reordering function or the reordering entity reorders received MAC-hs PDUs according to the received TSN. MAC-hs PDUs with consecutive TSNs are delivered to the disassembly function (see below) upon reception. MAC-hs PDUs are not delivered to the disassembly function if MAC-hs PDUs with a lower TSN are missing. There is one reordering entity for each queue ID configured at the UE. Finally, it comprises the disassembly entity which is responsible for disassembling of MAC-hs PDUs. When a MAC-hs PDU is disassembled, the MAC-hs header is removed, the MAC-d PDUs are extracted and any present padding bits are removed. Then the MAC-d PDUs are delivered to higher layer.

In case of HS-DSCH a MAC PDU consists of one MAC-hs header and MAC-hs payload (one or more MAC-d PDUs), where the payload consists of one or more MAC-d PDUs from one or several MAC-d flows. A maximum of one MAC-hs PDU can be transmitted in a TTI per UE. The MAC-hs header is of variable size and the MAC-hs payload in one TTI belongs to the same reordering queue.

Figure 3:
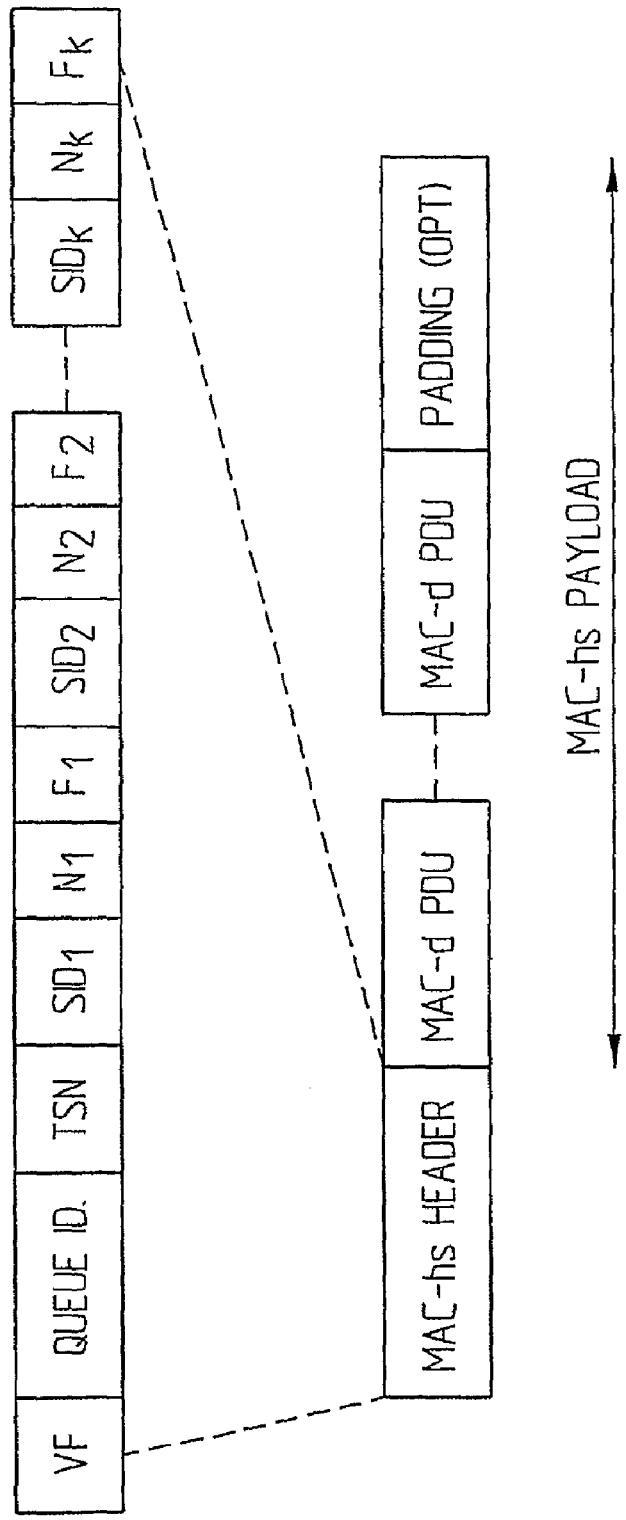
FIG. 3 shows a state of the art MAC-hs PDU.

FIG. 3 schematically shows a MAC-hs PDU as described in 3GPP TS 25.321 chapter 9.2.1. In the figure the MAC-hs payload is indicated and a MAC-hs header which will be further described herein. A MAC-hs header comprises a version flag (VF) field which is a one bit flag providing extension capabilities of the MAC-hs PDU format. It should be set to zero according to the standard. It further comprises a queue identifier, the queue ID field, which provides identification of the reordering queue in the receiver in order to support independent buffer handling of data belonging to different reordering queues. The length of the queue ID field is 3 bits.

It further comprises a Transmission Sequence Number (TSN) field which provides an identifier for the transmission sequence number on the MAC-hs PDU. The TSN field is used for reordering purposes to support in-sequence delivery to higher layers. The length of the TSN field is 6 bits. Subsequently it comprises a Size Index Identifier (SID) field which identifies the size of a set of consecutive MAC-d PDUs. The MAC-d PDU size for given SID is configured by higher layers and it is independent for each queue ID. The length of the SID field is 3 bits. There is also an N-field identifying the number of consecutive MAC-d PDUs with equal size. The length of the N-field is 7 bits. In the Flag-F-field is a flag indicating if more fields are present in the MAC-hs header or not. If the F-field is set to "0", the F-field is followed by an additional set of SID, N and F-fields. If the F-field is set to "1" the F-field is followed by a MAC-d PDU.

Figure 4A:
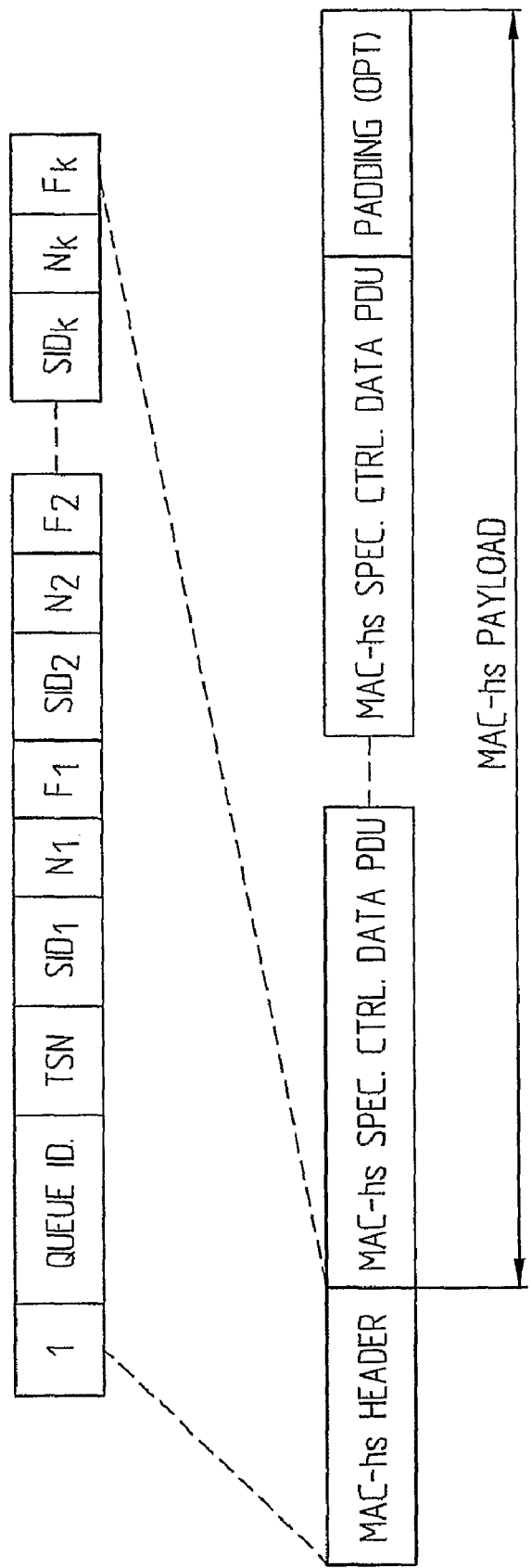
FIG. 4A shows a MAC-hs PDU wherein a specific probing or information control message indication is provided in the VF-field.

FIG. 4A describes a MAC-hs PDU wherein, according to the present invention, the version field (VF) is used as an indication of a MAC-hs specific probing or information control message, in the following also briefly denoted MAC-hs control message or simply control message (frame).

Probing is a mechanism where Node-B initiates a MAC-hs transmission, where MAC-hs payload does not consist of MAC-d data. The MAC-hs payload used for probing shall be discarded at the UE MAC-hs protocol entity. It can be used to test internal TFRC algorithms against real transmissions or to improve internal TFRC algorithms. It can also be used as an UE polling mechanism to check whether the UE is actually present and ready to receive data. The MAC-hs Specific Control Data PDU may be of variable size and number (N) to test actual transmission of small TBS (Transport Block Size) or large TBS.

In this case VF is set to 1. In this embodiment interpretation of the other fields would be that the queue ID indicates to which queue this specific control message refers, TSN is unused and the SID fields may be unused or set to a default value for control messages, or to different values if different sizes of control messages are used. The N and F fields operate normally, i.e. as described with reference to FIG. 3.

According to the invention VF=1 directly indicates that there is a specific information control message according to the invention. Since VF concerns the whole packet, no "conventional" user data can be sent, different from the implementation described with reference to FIG. 5 wherein a SID field is used as an indication of a specific information control message. If only one of the SID frames is given a specific value, the others may relate to "conventional" data. If all SID frames are given the specific value, only a specific information control message can be sent as in FIG. 4A.

Figure 4B:
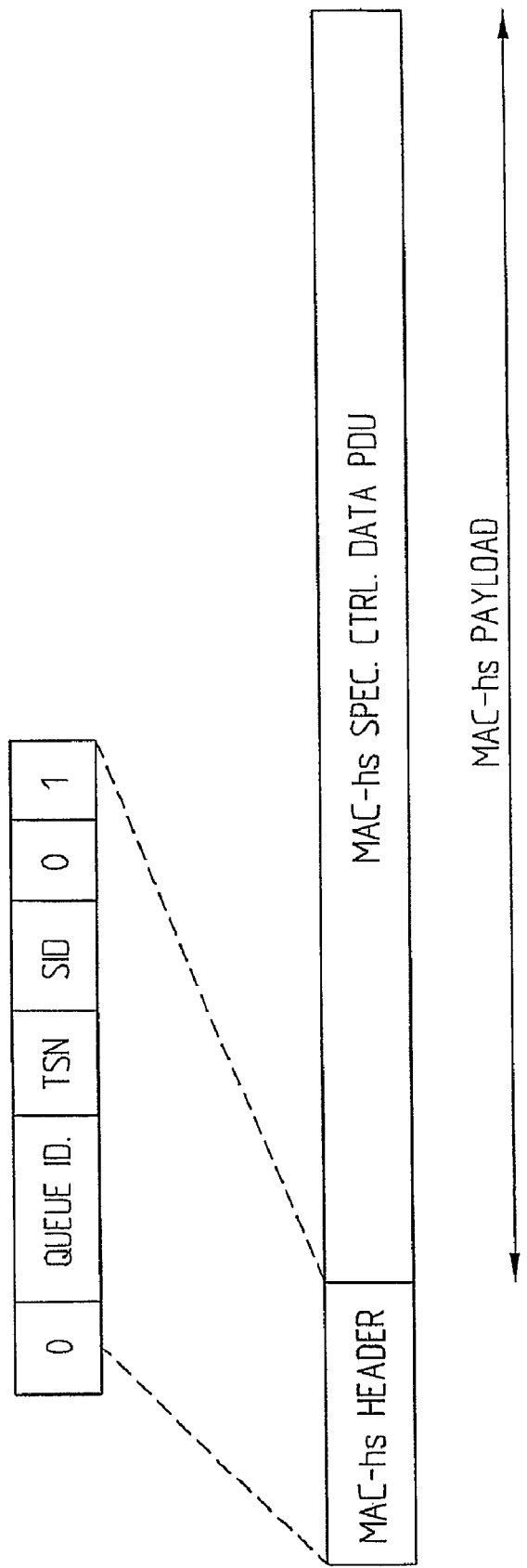
FIG. 4B shows a MAC-hs PDU wherein an indication is provided in the header in an alternative manner and the payload comprises only specific control data.

FIG. 4B describes a MAC-hs PDU wherein, according to another embodiment of the present invention, the indication of a MAC-hs specific probing message is signalled by the presence of only one SID/N and F set, and whereas N is set equal to 0. The complete space of the MAC-hs payload shall be used for signalling of the MAC-hs Specific Control frame, and may be of variable size to test actual transmission of small TBS up to large TBS. It can be noted that when the content of the MAC-hs Specific Control frame is equal to padding this is an indication of a Probing Control frame. Thus, according to the embodiment shown in FIG. 4B VF=0, N=0 and F=1. The queue identity may be a legitimate queue identity for a mobile user station, SID may also be indicated in a normal manner. There is however only one set of SID/N/F. A receiver will then receive the packet in a normal way, but the situation is a special situation since N=0.

If, as in FIG. 4B, the MAC-hs payload, consists of the MAC-hs specific control data, no padding at the end, the mobile station will interpret the whole field as data.

Figure 4C:
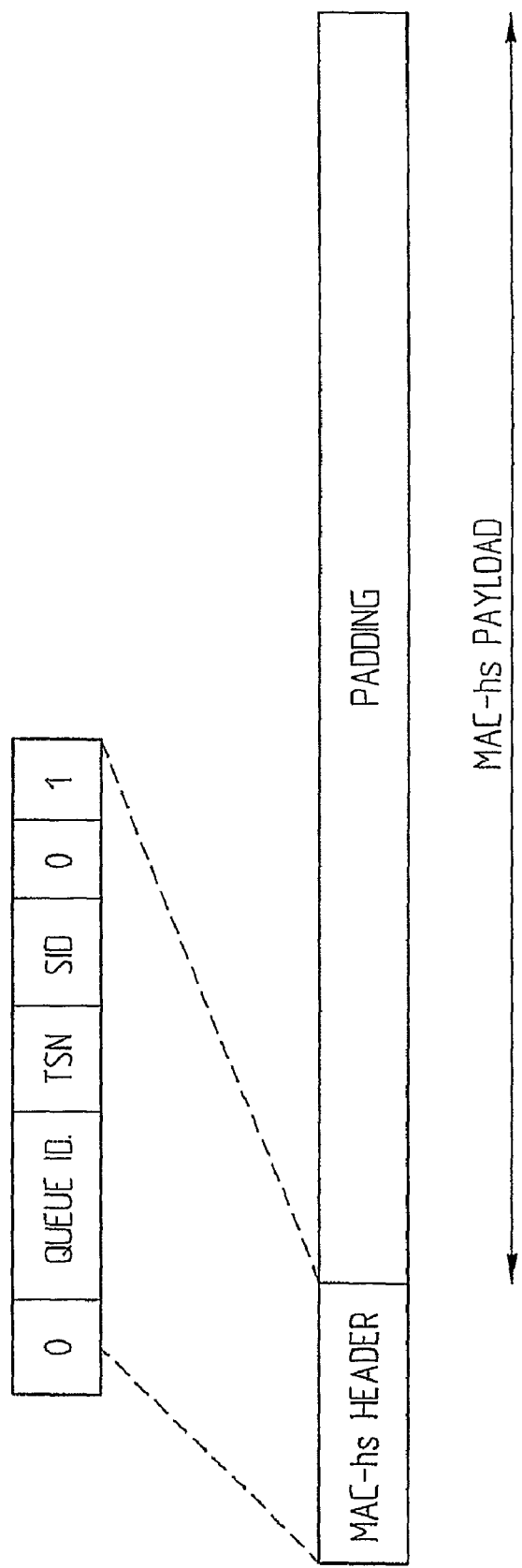
FIG. 4C is a figure similar to FIG. 4B but wherein the payload only consists of padding, i.e. a null data message.

FIG. 4C shows another implementation of the embodiment in FIG. 4B wherein the whole information field only comprises padding. The mobile user station will normally discard it, and may, in particular implementations mark TSN in reordering queue as received and without content. (Alternatively, it is discarded and the reordering queue is not updated).

This will then constitute a probing control frame, or null-data; i.e. it discloses one way of providing a null data message.

Figure 5:
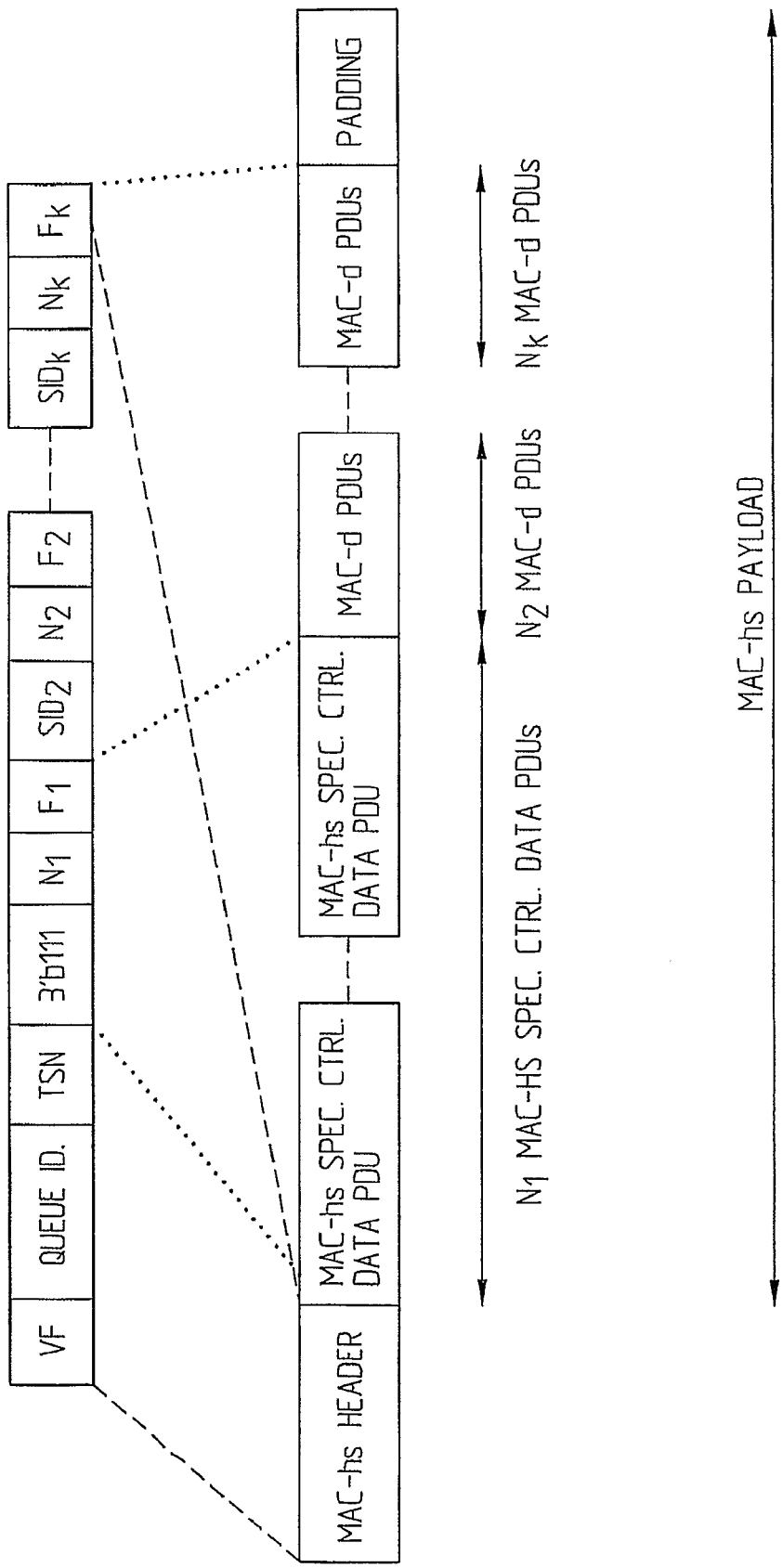
FIG. 5 shows a MAC-hs PDU where information relating to the inclusion of a specific probing or control information message indication according to the present invention is provided in the/a SID-field of the header.

FIG. 5 is a figure similar to FIGS. 3 and 4A or 4B, 4C but illustrating still another embodiment than those described in FIGS. 4A, 4B, 4C in which instead of e.g. the VF-field the (here one) SID field is used and wherein a specific SID value is an indication of a specific information control message, for example SID$3'b$ 111. The operation of the other fields would then be normal operation for all the fields. In particular the MAC-hs receiver should interpret the specific control message prior to the MAC-hs transmission to the RLC layer. This means that reception must pass the reordering entity of the UE before the specific control message is interpreted. This mechanism can for example be used by Node-B to trigger the exceptional handling in the UE (e.g. timer based stall avoidance) when for instance Node-B has discarded a MAC-hs.

According to another embodiment similar to the embodiment described with reference to FIG. 5, the UE shall interpret the specific information control messages prior to delivery to the reordering entity. Then the specific information control message would be interpreted immediately by the MAC-hs receiver control plane.

FIG. 5, with dotted lines, illustrates which SIDs correspond to which data, i.e. the first SID ($3'b111$) indicates and corresponds to the specific control data whereas the other SIDs ($SID_2, \ldots, SID_K$) relate to $N_2$ MAC-d PDUs, size given by $SID_2, \ldots, N_k$ MAC-d PDUs, size given by $SID_K$.

Figure 6:
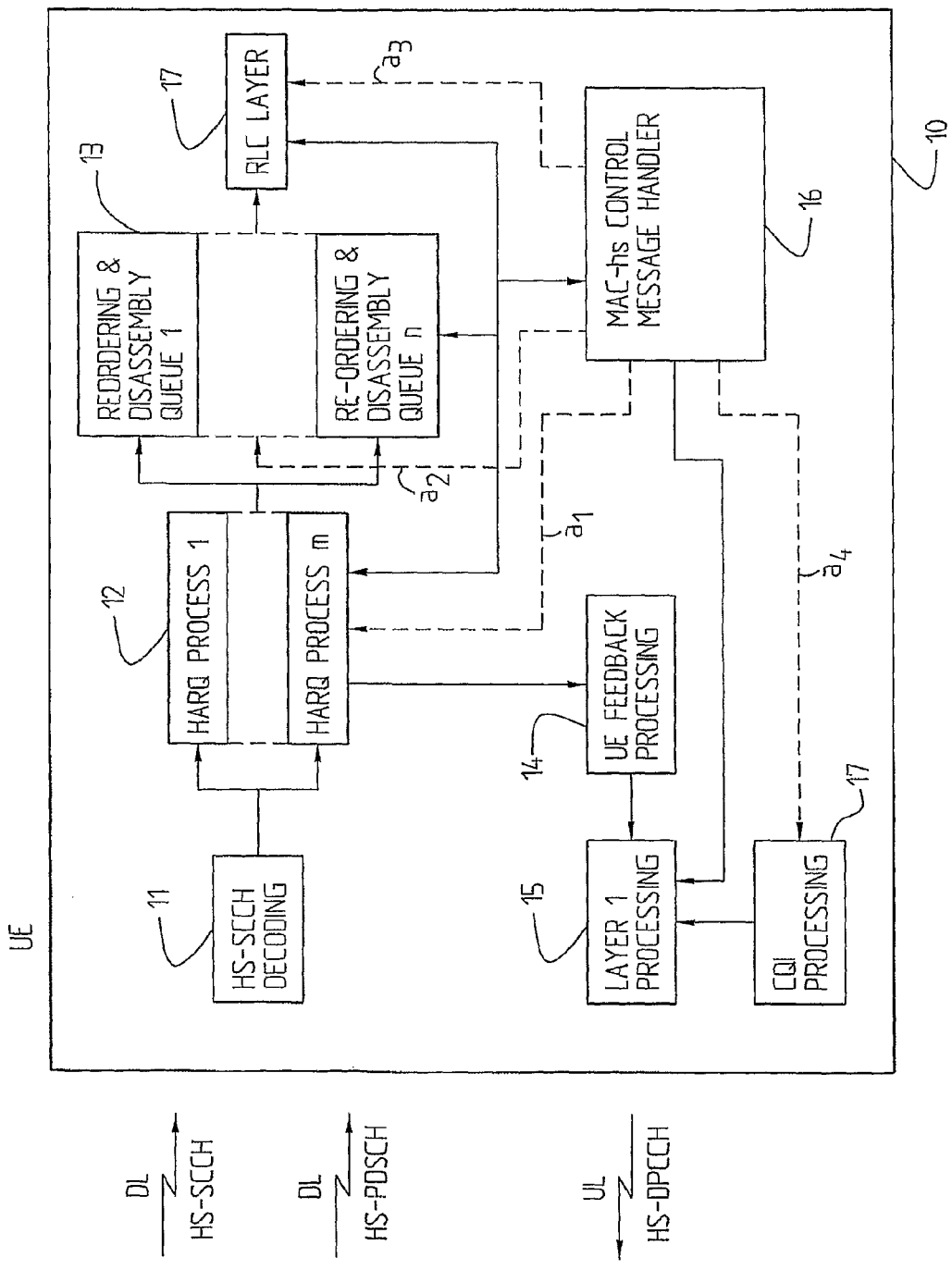
FIG. 6 is a schematical block diagram of a mobile user station (UE) only showing the functions necessary for carrying out the inventive concept.

FIG. 6 is a schematical block diagram of a UE 10 according to the present invention. It should be clear that only those parts or functions that are relevant for the description of the inventive concept are included. Downlink traffic to the UE is received over the HS-SCCH for control signalling and the HS-PDSCH for packet payload. The control signalling slightly precedes the actual payload such that the UE can get prepared to receive the packet payload. In HS-SCCH decoding means 11 an incoming message (on the HS-SCCH control channel) for example the identity of the mobile station UE is used to establish if the UE message is appropriately received by the correct UE. From HS-SCCH, if the control message is appropriately decoded or successfully decoded, it is known to which HARQ process in the HARQ entity 12 the MAC-hs PDU should be directed. If also the HARQ process can be successfully decoded, and a MAC-hs PDU is successfully decoded, it is known to which queue in the reordering and disassembly entity 13 it should be provided. It is then established if it can be forwarded to the RLC layer, 17, however, it is also established in the MAC-hs control message handler 16 if the MAC-hs PDU is a specific control message, or a control MAC-hs PDU. This can be done in different manners as briefly described with reference to the flow diagrams 8-12 below but also in any other appropriate manner. If the HARQ process is successfully decoded, information thereon is provided to UE feedback processing means 14 which forwards the relevant information to Layer 1 processing means 15 which maps the relevant message on an uplink HS-DPCCH channel for transmission to for example Node-B.

Generally the specific control message according to the invention is included in the MAC-hs PDU and acknowledgement that a HARQ process has been successfully decoded may also serve as an indirect indication that the specific control message has been received. This is no explicit or direct acknowledgement that the specific control message has been received, but since the MAC-hs PDU has been successfully decoded etc., also the specific control message will have been observed.

The inventive concept is however not limited to the provisioning of any acknowledgements whatsoever, but also simply covers sending a specific control message to the mobile station from the base station.

However, in some implementations the specific control message may be of different types. It may for example consist of a reset message resetting all HARQ processes and queues. Such a procedure is indicated with dashed lines in the figure, $a_1$-$a_4$, i.e. the HARQ entity 12 has to be notified by the control message handler 16 that all processes should be reset $a_1$. Also the reordering and disassembling entity 13 has to be informed thereon, $a_2$, or instructed to reset all queues. An indication that everything has been reset also has to be provided, $a_3$, to RLC 17. Then however, some active response acknowledgement to the base station (Node-B) is normally required and of course a dedicated or specific channel can be used for that purpose. As an alternative thereto the CQI processing means 17 can be used as a return channel, $a_4$, for example on a time division basis. The CQI processing means 17 communicates with Layer 1 processing means 15 mapping the message on the uplink HS-DPCCH channel as described above. It should be clear that the MAC-hs control message handler 16 also could have been provided between the HARQ entity 12 and the reordering and disassembly entity 13. Also for a null data message (probing message) the response (e.g. acknowledgement) to Node-B could be done via CQI processing means 17 but the simplest way is to use in any case normally sent messages which are provided, for example if the HARQ process decoding was successful or not, if the HS-SCCH decoding was successful or not, which hence means that already "existing" ACKs/NACKs are used as indirect indications.

Figure 7:
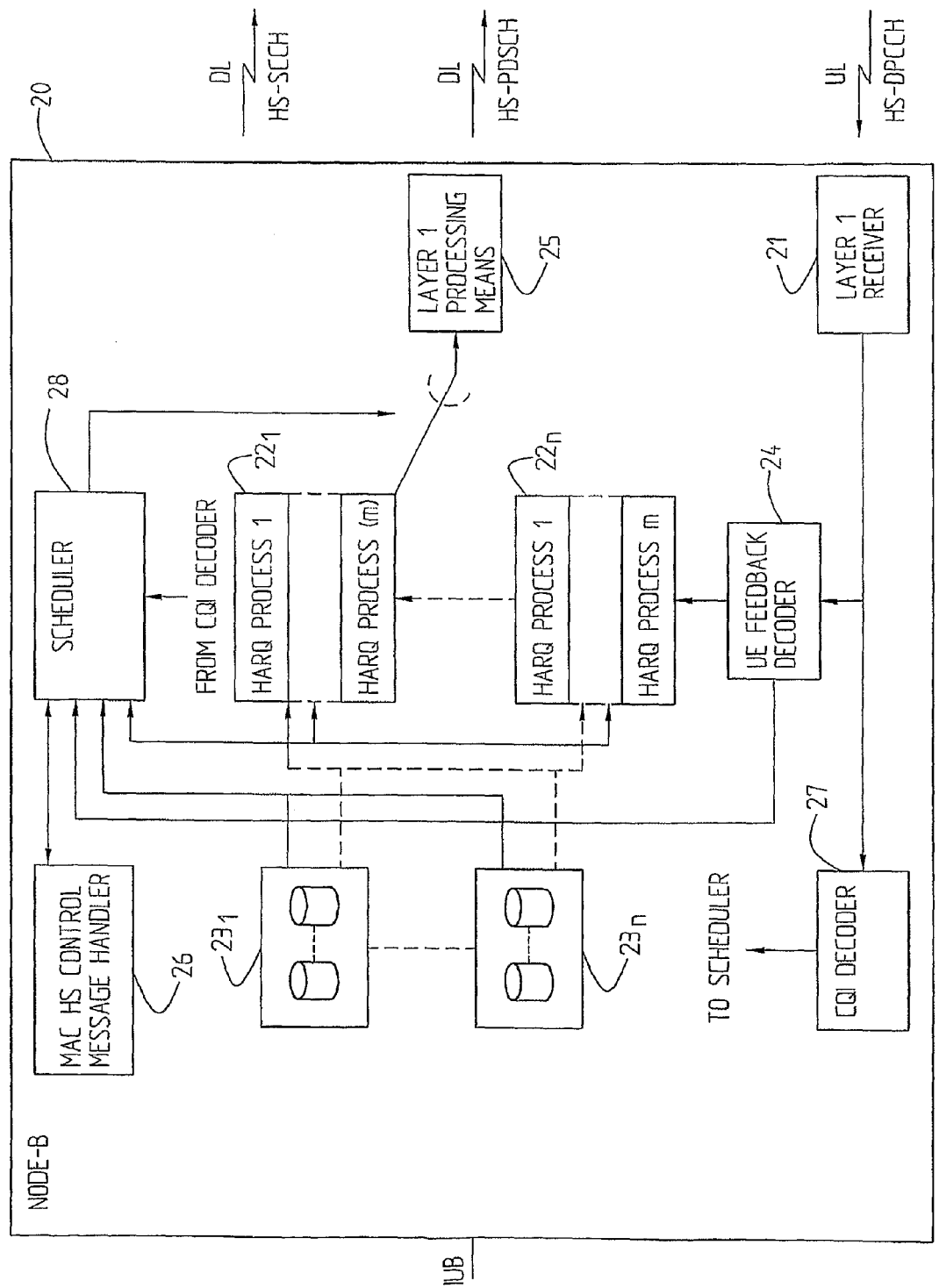
FIG. 7 is a schematical block diagram of a base station arrangement, here Node-B, with the functions relevant for carrying out the inventive concept.

FIG. 7 is a block diagram describing those functions of a base station arrangement 20, here UMTS Node-B, which are necessary for the functioning of the present invention. For reasons of clarity all other functions etc. are omitted. On the uplink, from UEs sent control messages are received over HS-DPCCH whereas for downlink traffic, control packets or control messages are sent over HS-SCCH and payload over HS-PDSCH. Node-B 20 comprises a number of buffers $23_1, \ldots, 23_n$; one input buffer per UE and per served queue. As discussed above it also comprises a number of HARQ entities, $22_1, \ldots, 22_n$, one HARQ entity for each UE. Each HARQ entity in turn comprises a number of HARQ processes, here it is supposed to be m processes for each UE. Node-B also comprises a Layer 1 receiver 21 for e.g. receiving messages from the UEs, UE feedback decoder 24 e.g. decoding ACKs or NACKs or DTX. DTX means that neither the control (also conventional) messages nor payload has been correctly received/decoded by an UE. This information is provided by decoder 24 to all HARQ entities $22_1, \ldots, 22_n$ and, to the scheduler 28. If the specific control message according to the present invention requires an action, i.e. it is for example a reset message etc. as briefly mentioned above and as will be further discussed below, particularly with reference to FIG. 12, the specific control message, or rather a response thereto from an UE, is e.g. provided for example by the CQI channel as discussed with reference to FIG. 6. The scheduler 28 is the central part of the Node-B which optionally only handles control messages, i.e. no payload, and it is also in communication with the MAC-hs control message handler 26 providing specific probing or information control messages according to the invention, also simply denoted specific control messages.

The scheduler provides messages to Layer 1 processing means 25 over the appropriate HARQ $22_1, \ldots, 22_n$ as indicated by the switch acting as an input to Layer 1 processing means 25. Only (substantially) control information is provided from the input buffer queues $23_1, \ldots, 23_n$ to scheduler 28 whereas the payload, e.g. MAC-hs PDU payload, is provided from the input buffers to the appropriate HARQ process $22_1, \ldots, 22_n$. The scheduler 28 is capable of handling the information about specific control messages (and responses), according to the invention an indication of which for example only is contained in the MAC-hs header, e.g. in one field thereof for example the VF field or a SID field or N field as discussed above. "IUB" in the figure illustrates the IUB interface.

CQI processing means or CQI decoder 27 receives information from Layer 1 receiver 21 and provides information to the scheduler 28 related to channel quality estimates etc.

Figure 8:
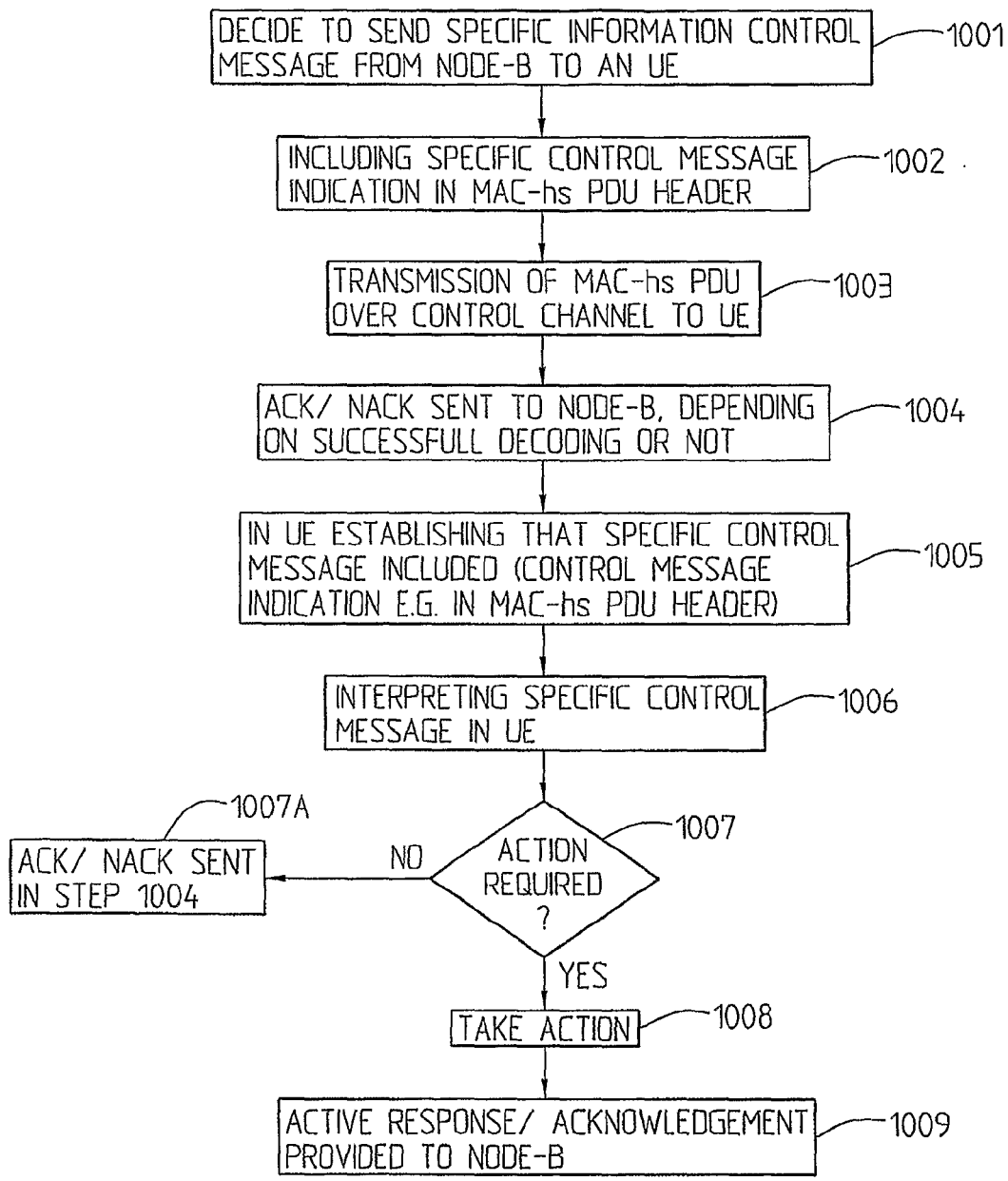
FIG. 8 is a general flow diagram describing an overview of the inventive concept.

FIG. 8 is a very schematical flow diagram describing the inventive concept. Thus, for some reason, as discussed earlier, it is supposed that Node-B decides to send a specific control message, 1001. The specific control message itself is then included in the MAC-hs PDU payload, whereas in the header an indication thereof is provided in one (or more) field(s) thereof, 1002. The MAC-hs PDU is then transmitted over the control channel (HS-SCCH) and physical data channel (HS-PDSCH) to the UE, 1003.

If the MAC-hs PDU can be successfully decoded (cf. e.g. FIG. 9) or not, gives rise to the sending of an ACK or a NACK, 1004, to Node-B. Then it is established or detected if the MAC-hs PDU (header) contains a specific control message indication, 1006. If yes, it is determined if an action is required (if several types of specific control messages can be used, i.e. such requiring an action and such that do not require an action), 1007. (I.e. the UE shall first detect if the specific control message indication is provided, and then handle the control data itself.) If not, the ACK/NACK sent in step 1004 above serves as an indirect indication as to whether the specific control message has been received in UE or not, 1007A, and this provides the Node-B with the desired information (e.g. as to availability of the UE). If an action is required, UE takes the relevant action, 1008, and provides a response or acknowledgement to Node-B (actively), 1009. However, also in some cases the ACK/NACK of step 1004 may replace an active response.

Figure 9:
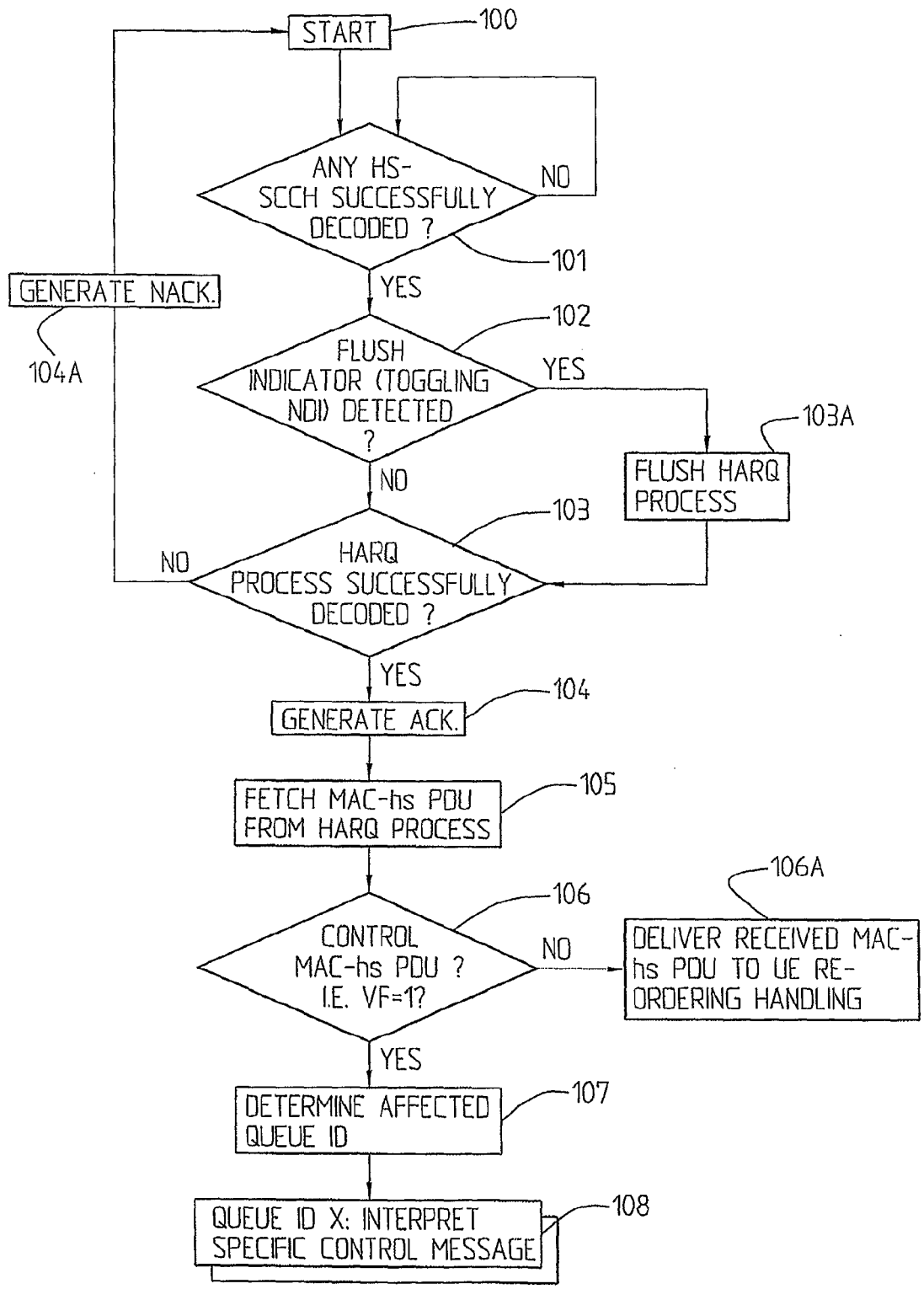
FIG. 9 is a flow diagram describing the procedure in an UE according to a first embodiment.

FIG. 9 is a flow diagram describing a procedure in an UE according to a first embodiment. As referred to above with reference to FIG. 6, it is supposed that a MAC-hs PDU control message is incoming, 100, i.e. first the control message is incoming over the HS-SCCH and, if the decoding can be appropriately done, the payload follows over the HS-PDSCH. Thus, first an examination is done to establish whether HS-SCCH was successfully decoded, 101, e.g. if using the identity of the mobile user station (RNTI), i.e. if the HS-SCCH message was addressed to that mobile user station (UE). If not, the procedure is repeated for all other HS-SSCH codes that may be used by the Node-B. If the decoding of other possible HS-SCCH codes is unsuccessful the processing will continue in subsequent TTI. If however the decoding is successful, i.e. the UE is the correct UE, it is established whether a toggling NDI (e.g. a flush indicator) is detected, 102.

However, a mobile user station normally can receive on one of up to four control channels. This means that steps 100, 101 are repeated for all these control channels, unless, of course, decoding is successful for the first, or the second etc., in which case it is proceeded with step 102. A reason for sending on e.g. four control channels is to be able to transmit to up to four UEs in the same TTI using code multiplexing.

From the HS-SCCH message it can be seen which is the appropriate HARQ process. NDI toggles between 0 and 1 each time the MAC-hs payload in the HARQ process at the Node-B has changed. As long as the packet is retransmitted, it should hence be the same NDI (0 or 1). If there is a toggling NDI indication, the HARQ process concerned should be flushed, 103A, prior to the decoding of the HS-PDSCH. If however there is no toggling NDI, or flush, indicated, information stored from previous MAC-hs transmit attempts for this HARQ process can be combined with current incoming HS-PDSCH in the attempt to decode the MAC-hs PDU, 103. If not, a NACK is generated, 104A, and the procedure is repeated. It can be noted that concurrent MAC-hs transmissions to one and the same UE will occur on the same HS-SCCH to simplify implementation requirements of the UE (not shown in figure).

If on the other hand it is established that the HARQ process has been successfully decoded, an ACK is generated, 104, and the MAC-hs PDU is fetched from the HARQ process in question, 105. Then it is established whether a control MAC-hs PDU according to the invention is included, in this embodiment it is established whether in the VF-field VF=1 in the MAC-hs PDU header, 106. If not, the received MAC-hs PDU is delivered to UE reordering handling, 106A. If on the other hand it is established that VF=1, it is established which is the identity of the affected queue (or queues if the MAC-hs PDU contained control messages to more than one queue), 107. Then the specific control message is interpreted in the queue with the established identity ID, here denoted X, 108. In this case there may be implemented an indirect verification (ACK/NACK) if the specific control message has been received, namely since the specific control message indication is contained in the MAC-hs PDU header, and if the HS-SCCH can be successfully decoded and the HARQ process also, then the specific control message is received. Thus the in step 104 generated ACK also serves as an acknowledgement (indirect) that the specific control message is included and received.

Figure 10:
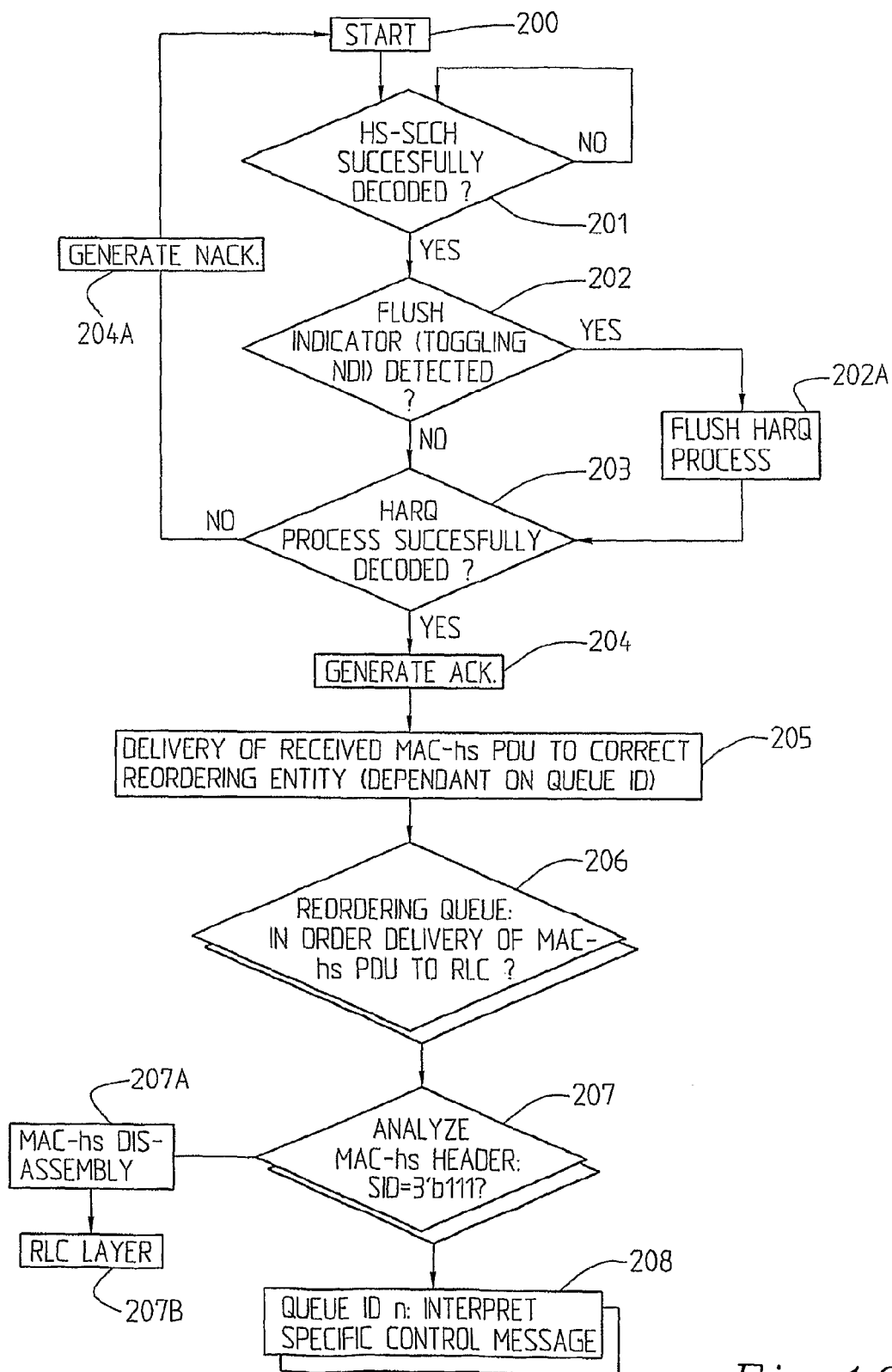
FIG. 10 is a flow diagram describing the procedure in an UE according to a second embodiment.

FIG. 10 is a flow diagram describing an embodiment corresponding to FIG. 5 illustrating the case when a specific SID value is used as an indication of a specific control message, wherein the other fields are used as in a normally operating case. Steps 200-204, 204A correspond to steps 100-104, 104A of FIG. 9 and will therefore not be further discussed here. If however it has been established that the HARQ process has been successfully decoded and an acknowledgement has been provided to the base station arrangement, e.g. Node-B, the received MAC-hs PDU that was received is delivered to the correct reordering entity depending on the contained queue ID, 205. This step actually includes a number of steps in the reordering entity of a mobile station UE. This is done in a known manner for example described in 3GPP TS 25.321 chapter 11.6.2.3 and the task of the reordering entity is to make sure that all MAC-hs PDU packets are delivered in the right order to higher protocol layers. In the respective reordering queue it is thus established whether the MAC-hs PDU can be delivered in a correct order to RLC, 206. If not, it is returned to step 200. If however the outcome is affirmative, an acknowledgement may be sent (not shown) and the MAC-hs PDU header is analyzed to establish whether the packet contains a specific control message according to the present invention (i.e. if there is an indication in the header). In this case it is supposed that SID=3'b111 is the indicator of a specific control message, 207. If there is no specific control message, the MAC-hs PDU is transferred to a disassembling entity where the header is removed, 207A, and the MAC-hs PDU payload is forwarded to the RLC layer, 207B. If however it is established that there is a specific control message, in a queue with an identity n, which is supposed to be the queue which is relevant for the particular MAC-hs PDU, the specific control message is interpreted. It may be a specific control message relating to some action to be taken but it may also be a null data message. In the latter case a normally sent acknowledgement as referred to above, serves as an acknowledgement (indirect) that the UE has received the specific control message, and in that manner the base station arrangement would be aware of that fact, 208. If the specific control message requires some action, a response may be returned "actively".

It should be clear, as discussed earlier, that either one, or more, or all SID:s may contain a indicator as described above. If one or more does not, also other data (i.e. MAC-d PDU) may be contained in the payload.

It should be noted that in the embodiment described with reference to FIG. 10, the MAC-hs receiver should interpret the specific control message prior to the MAC-hs transmission to the RLC layer. The in-sequence delivery criteria are considered before the message is interpreted (any possible MAC-hs control message must pass the reordering entity in the UE before the specific control message(s) is/are interpreted) and this mechanism can be used by a Node-B to trigger an exceptional handling in the UE when for instance Node-B has discarded a MAC-hs PDU.

Figure 11:
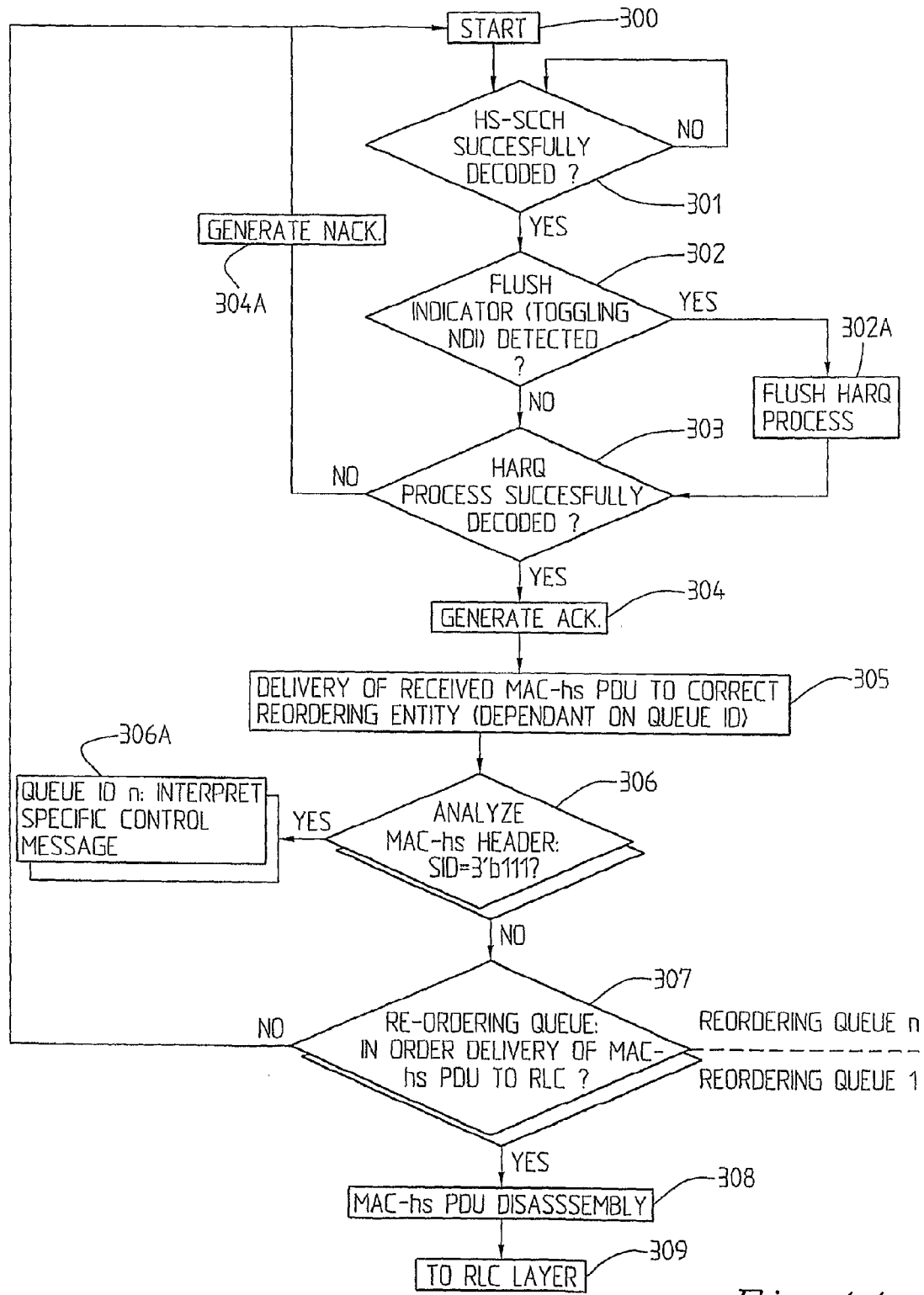
FIG. 11 is a flow diagram describing the procedure in an UE according to a third embodiment.

FIG. 11 shows an embodiment similar to the one described with reference to FIG. 10 but with the difference that the UE ignores the in-sequence delivery, any possible MAC-hs control message must not pass the reordering entity in the UE before the specific control message(s) is/are interpreted, for control messaging. In this case a specific control message is immediately interpreted by the MAC-hs receiver control plane. Hence, steps 300-304, 304A correspond to steps 100-104, 104A or 200-204, 204A of FIG. 9 and FIG. 10. Step 305 moreover corresponds to step 205 of FIG. 10. However, following step 305, the MAC-hs PDU header is analyzed, 306, to establish if, for example, there is a SID=3'b111, 306. It should be clear that any other indication than 3'b111 can be used, this is merely being given as an example. (E.g. N=0 could also be used). If yes, for the relevant queue ID the control message is interpreted, 306A. If not, the sequence delivery order is examined, 307, i.e. for the respective reordering queue, it is established whether a MAC-hs PDU can be delivered in the correct order to RLC, 307. If not, the procedure ends for this packet. If however, the in-sequence criteria is fulfilled, the MAC-hs PDU is sent to the disassembly entity where it is disassembled, i.e. the header is removed, 308. Then the packet MAC-hs PDU payload is forwarded to the RLC layer, 309.

Figure 12:
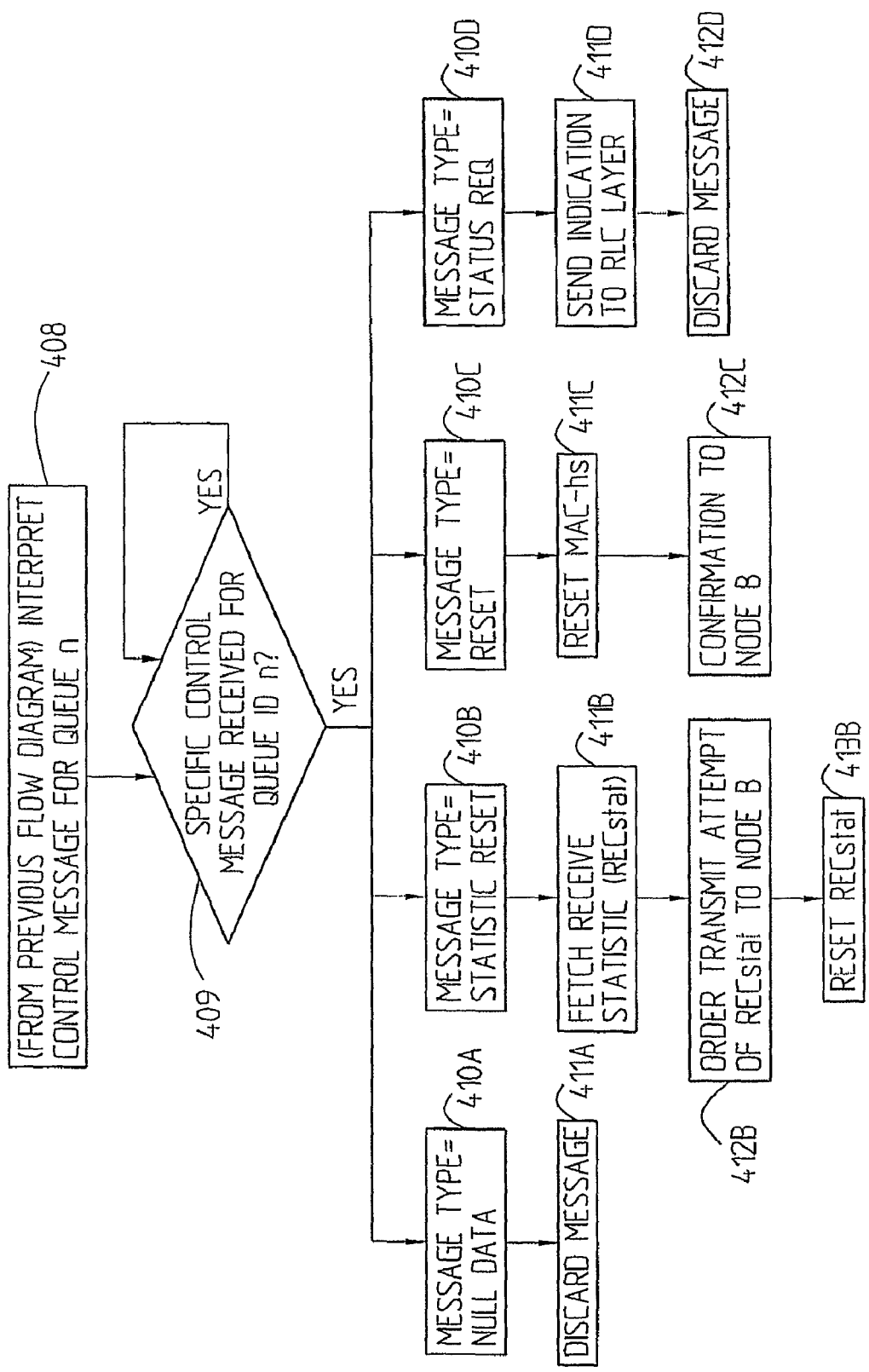
FIG. 12 is a flow diagram describing the procedure in an UE describing the interpretation of a specific control message subsequent to, for example, the procedure that is described with reference to any one of FIGS. 9-11.

FIG. 12 is a block diagram describing possible alternative procedures for different kinds of specific control messages. It should be clear that the inventive concept is not limited to cases where a specific control message comprises or may comprise different types, implementations are possible where the message type only for example comprises null data or only one or more of the other types or still other, not discussed, types. However, FIG. 12 is a flow diagram describing the procedure per receiver queue starting with a step when the control message for a queue n is interpreted, 409. This may be the step that follows on or corresponds to step 108 (cf. FIG. 9) or the step corresponding to step 208 (cf. FIG. 10) or step 306A (cf. FIG. 11).

It is established whether there is a specific control message received for a queue with the identity n, 408, (it should be clear that steps 408, 409 may be done in any order). However, supposing that the control message has been interpreted, and it has been established that it is a specific control message of type Null Data, 410A, the message is discarded, 411A. In this case it is particularly supposed that indirect acknowledgement is implemented and the normally existing acknowledgement procedures corresponding to successful decoding as discussed above are taken as an acknowledgement that a specific control (null) data message has been received.

A message of type Null Data may for example be used by Node-B to test the transmission capability of an UE, i.e. to establish if the UE is available, the reception quality per TBS etc.

As an alternative, it may have been established that the specific control message is of type Statistic Reset, 410B.

Then, in the UE the receive statistic (REC stat) is fetched, 411B, and a transmit attempt of REC stat to Node-B is ordered, 412B. Finally REC stat is reset, 413B. This message type may be used by Node-B to reset the statistic information calculated in an UE, it may for example be assumed that the UE stores statistic information about the amount of successfully decoded HS-SCCH and HS-PDSCH and/or successful reception of HS-SCCH, but failure to receive HS-PDSCH. The quotient successfully decoded HS-SCCH/successfully decoded HS-SCCH and HS-PDSCH could be mapped onto the CQI report range 0, . . . , 31 where 31 is defined as a value very close to 1 and 0 as a value very close to 0 of the quotient. The value could be reported back to Node-B at specific returned time occasions when the normal CQI is replaced by the quotient. By sending a Statistic Reset, UE could flush the two statistical counters.

In still another embodiment the message is of type Reset, 410C. This e.g. means that the UE should reset the MAC-hs entity for the specific queue or for all queues, 411C. All HARQ processes should flush its content and revert to a state equal to the start-up state and all reordering units should be flushed resetting all variables (e.g. Next Expected TSN) to start-up state etc. and it is a considerable action that means that a confirmation back to Node-B is required, 412C. This specific control message is hence used to reset MAC-hs PDUs, i.e. to set TSN to 0 and to optionally deliver all acknowledged but not yet delivered MAC-hs PDUs to the RLC layer. The confirmation can be done in the same manner as discussed above for example using the CQI in a time divided manner.

Still another message type may relate to a Status Request, 410D. It is hence supposed that an indication is sent to the RLC layer, 411D, and the specific control message is then discarded, 412D. RLC Layer is supposed to send a STATUS request message at the reception of the indication. In this case direct or indirect acknowledgement may be implemented as discussed earlier, as well as no acknowledgement at all.

The RLC layer operates above the MAC-hs protocol in the protocol stack. It is e.g. described in 3GPP TS 25.322 v6.4.0, Radio Link Control (RLC) protocol specification.

The RLC layer can operate in three modes, transparent mode (TM)-unacknowledged mode (UM) and acknowledged mode (AM). In AM mode incorrectly received PDUs (Protocol Data Units) discovered by the receiving side are retransmitted by the transmitting side and forms an ARQ protocol (Automatic Repeat Request).

An AM RLC entity consists of a transmitting side, and a receiving side, where the transmitting side of the AM RLC entity transmits RLC PDUs and the receiving side of the AM RLC entity receives RLC PDUs. The AM RLC entity resides in the UE and in the RNC. The transmitting side segments and/or concatenates RLC SDUs into PDUs of a fixed length. The receiving side reassembles received PDUs into RLC SDUs and transmits to higher layers.

In AM mode the RLC layer is responsible for in sequence delivery of SDUs. The SDU is the data units that are received from/transmitted to the layer above RLC.

To facilitate in sequence delivery each PDU is given a sequence number, 0-4095, the transmitter transmits PDUs with increasing sequence number modulo 4096. Using the sequence number the receiver can detect a missing PDU and transmit a STATUS message indicating the missing PDU (or PDUs). The receiver can be configured to transmit a STATUS message upon the detection of a missing PDU. The transmitter can request for STATUS messages by setting a Poll flag in the PDU header. The mechanisms by which the transmitter sets the Poll flag are among others:

Last PDU in buffer:
When only one PDU exists in the transmission buffer.

Poll timer:
When the timer_poll expires, meaning that the transmitter requested for STATUS earlier and initiated a timer_poll to reassure that a response is received.

Window based:
A sender is restricted in the amount of "outstanding data" it can transmit until a STATUS confirms the reception to the receiving side. "Outstanding data" relates to the earliest unacknowledged PDU.

Selective retransmission is possible, e.g. if STATUS message indicates PDU with sequence number 3, 6 and 13 are missing, only 3, 6 and 13 needs to be transmitted.

It should be noted that this is of course not the only functionality of the RLC layer, but the other functionalities will not be discussed herein.

Figure 13:
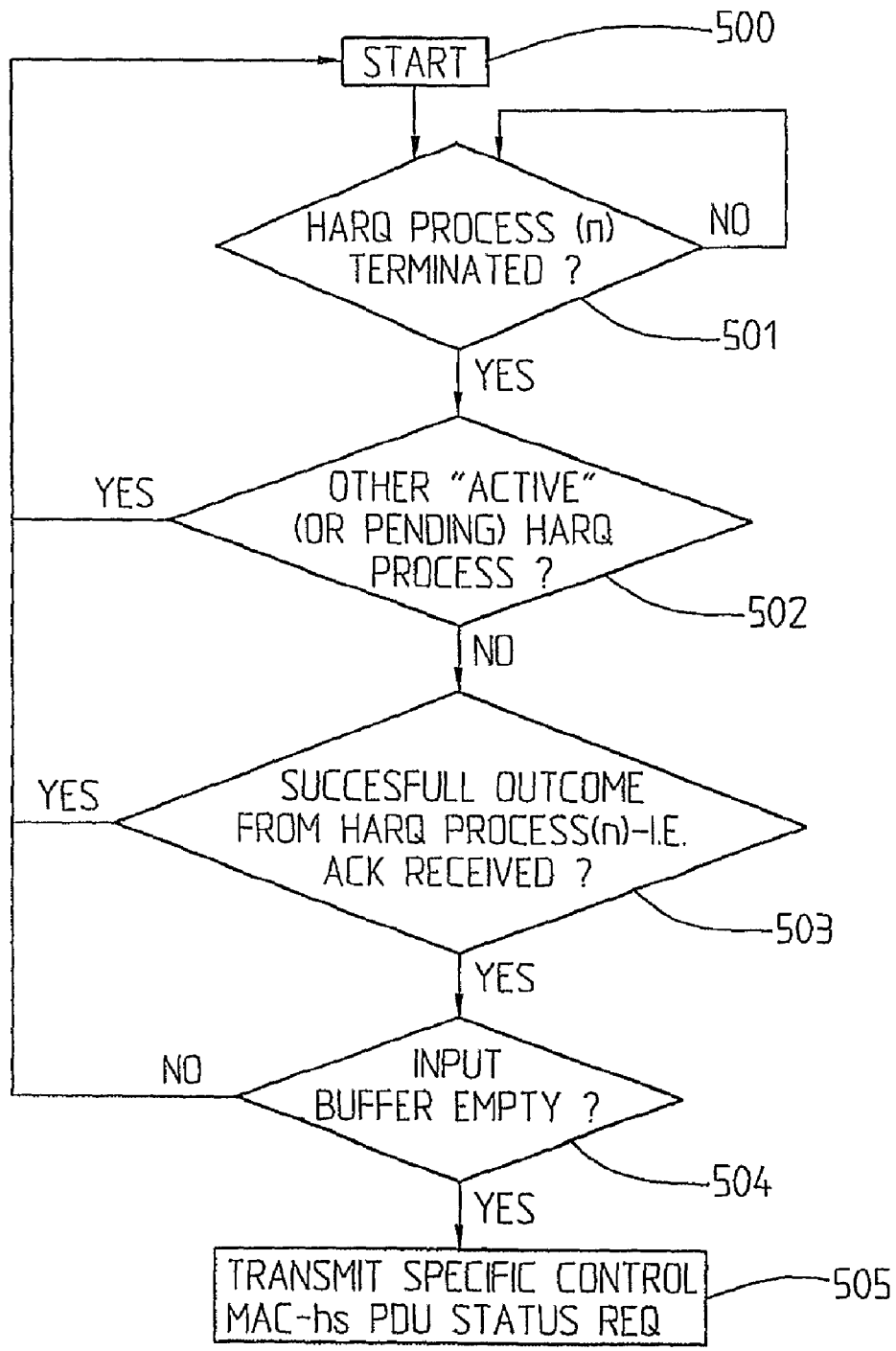
FIG. 13 is a flow diagram describing schematically the flow per Node-B in a node according to one specific application.

FIG. 13 is a flow diagram describing one implementation of a flow in a base station arrangement, particularly Node-B, for a particular application. In this implementation, Node-B initiates transmission of a STATUS Req. data control message if a last sent packet has not been acknowledged by the UE, i.e. that the UE did not correctly receive the data, in order to make sure that the last sent data has arrived at the mobile station UE. If Node-B is informed that the last sent data was correctly received, Node-B will know that the UE would take care of the situation when e.g. a second last sent packet was not correctly received.

Hence, the procedure is initated and it is established if there is a HARQ process, the relevant HARQ process n, is terminated, 501. If the relevant HARQ process has terminated, it is examined if there are other active or pending HARQ processes for the current HARQ entity, 502. If yes, it is returned to step 500 again. If not, it is examined whether there has been a successful outcome of the HARQ process (here process n), i.e. if an acknowledgement has been received, 503. If yes, Node-B is made aware of this fact and it is returned to the start position, 500. If however there has been no acknowledgement, it is examined if the input buffer is empty, 504. If not, the steps as from 500 are repeated. If the input buffer however is empty, a control MAC-hs PDU is sent, here it is supposed that it is a Status Request, 506. It may however also be Null data.

It is in this respect referred to FIG. 12 describing procedures when different types of specific control messages are received in the UE.

If a Status request type of specific control message is received, the mechanism initiates a procedure from the MAC-hs layer to signal to higher layers, the RLC layer, to initiate sending of a report (STATUS message) to the sending unit, i.e. the radio network controller. If Node-B notices that a packet has not been correctly received, the situation may be that the RLC layer is not aware about the fact that a packet has been discarded. This will be the situation if it is a last packet that was not correctly received. If is not the last one, the mechanism will already have been initiated in the UE to handle this case. It is to provide additional security that Node-B affects the MAC-hs layer of the mobile station UE to indicate to the RLC layer that a packet has been lost.

Figure 14:
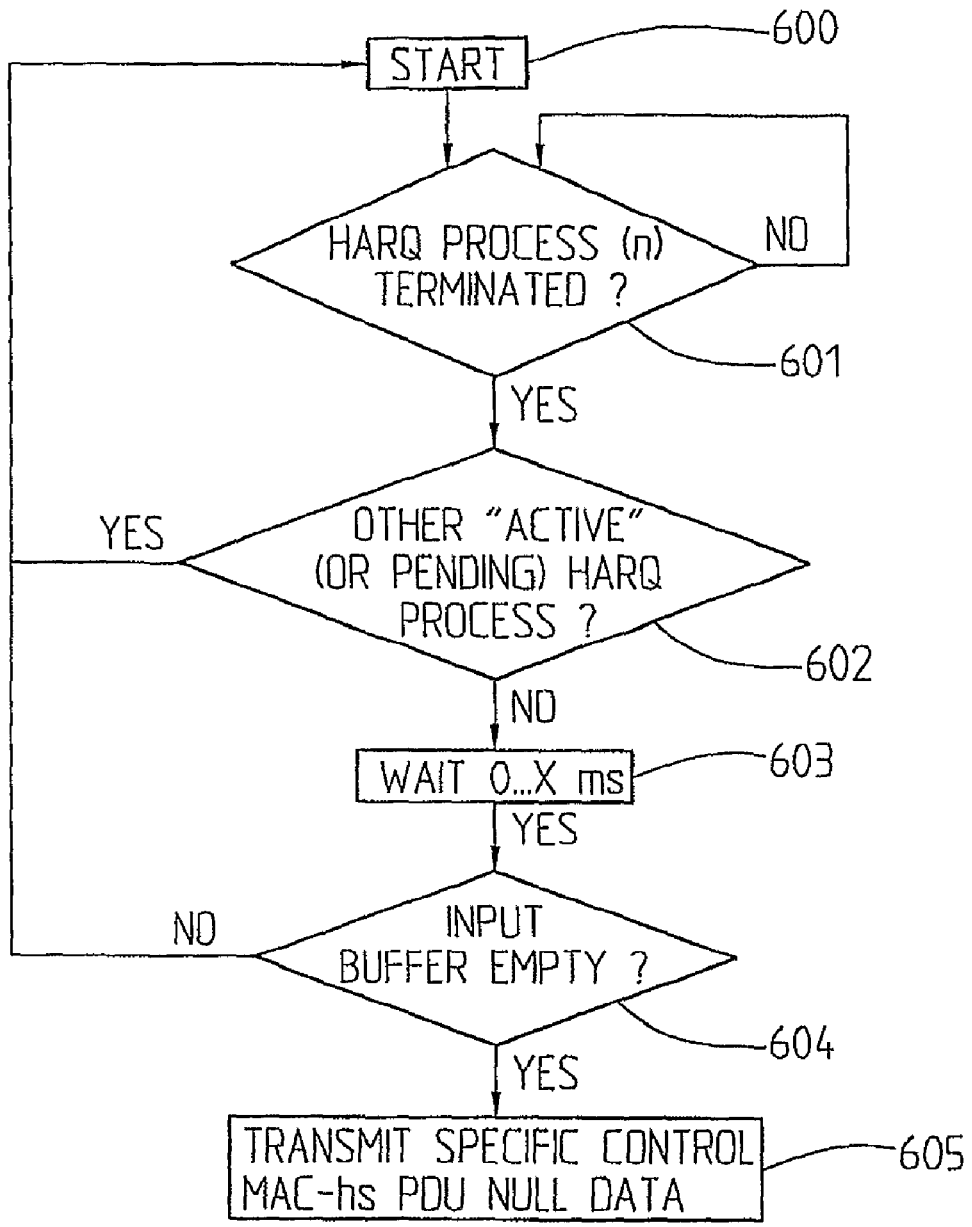
FIG. 14 is a flow diagram describing a procedure in Node-B per UE to provide Node-B with information about the reception conditions of respective UEs.

Finally FIG. 14 shows a flow diagram for one embodiment of a procedure in Node-B when voice over IP (VoIP) is sent wherein Node-B periodically (e.g. with a constant or varying periodicity between the null data control frames, e.g. 100 ms, 100 ms, 200 ms, 200 ms, 400 ms, 400 ms or any other appropriate (varying) periodicities) sends Null data specific control messages to be capable to keep relevant information about the reception conditions of the UE. There is a wait $0, \ldots, x$ ms box, the intention of which is to be able to control how often a MAC-hs PDU packet, e.g. a specific control message of type Null data, should be sent to the user equipment.

Hence, it is supposed that the procedure is initiated, 600, and it is established whether HARQ process (n) is terminated, 601. If yes, it is examined if there is any other active or pending HARQ process for the current HARQ entity, 602. If not, a waiting time, any of $0, \ldots, x$ ms is introduced, 603, and then it is established whether the relevant input buffer is empty, 604. If yes, a MAC-hs PDU specific control message with Null data is transmitted, 605.

It should be clear that other types of control messages (i.e. probing or information control messages, here also denoted specific control messages), can be sent and that the way of doing so can be varied in a number of ways. It should not be limited to what has been particularly described in the embodiments but merely by the appended claims. It should also be clear that the procedures of the inventive concept in general are not only applicable to Node-B and UMTS, but they are of course also applicable to other similar systems, nodes etc. Also in other aspects the invention is not limited to the particularly illustrated embodiments but it can be varied in a number of ways within the scope of the appended claims.

The invention claimed is:

1. A base station arrangement in a communications system supporting High Speed Downlink Packet Access (HSDPA) communication, comprising:
 a base station protocol entity for a protocol for communication with mobile user stations, said protocol handling high speed control signalling and physical resource allocation for high speed data communication, wherein the base station protocol entity comprises a control plane entity configured to support an extended or adapted control plane for control plane signalling messages, the control plane entity comprising specific control message handling means configured to provide a specific probing or information control message and to send said message to a mobile user station;
 wherein a specific information control message indication is provided in a header of a protocol data unit of the high speed protocol, and the specific control message is provided in the payload of said protocol data unit, wherein the protocol data unit originates in a MAC-hs layer; and
 wherein the specific probing or information control message comprises a null data message and the null data message is set where there is no Voice over Internet Protocol (VoIP) data in the buffering means and a queue has been set up for VoIP transmission.

2. The base station arrangement according to claim 1, further comprising interpreting decoding means configured to interpret a direct or indirect response reaction to a specific information control message from a mobile user station.

3. The base station arrangement according to claim 2, wherein the response reaction is indirect and comprises an acknowledgement or a non-acknowledgement.

4. The base station arrangement according to claim 3, wherein an acknowledgement or a non-acknowledgement of another action is used as an acknowledgement or non-acknowledgement of the reception of a specific probing or information control message.

5. The base station arrangement according to claim 2, wherein the response reaction is direct and comprises verification that a specific action has been performed and optionally additional information.

6. The base station arrangement according to claim 2, wherein the response reaction is indirect, wherein no response is indicative of reception of a specific control message at the mobile user station.

7. The base station arrangement according to claim 1, wherein the arrangement comprises or communicates with a radio base station.

8. The base station arrangement according to claim 1, wherein the arrangement comprises a Node-B of a UMTS system.

9. The base station arrangement according to claim 1, wherein the protocol data unit header comprises a queue identifying field, and an identity given in said queue identifying field indicates a specific data packet queue to which the specific control messages refers.

10. The base station arrangement according to claim 9, wherein the protocol data unit header further comprises a size index identifying field used for setting a default value for specific probing or information control messages or to indicate the size of the specific control message.

11. The base station arrangement according to claim 1, wherein the header comprises size index identifying fields and a specific size identifying value in one or more of said size index identifying fields is used to indicate a specific information control message, other fields of the header preferably being unaffected.

12. The base station arrangement according to claim 1, wherein the header comprises a version flag field with a version flag set to zero (0), and wherein the header contains one set only of size identifying field (SID), N-field identifying a number of consecutive packet data units with equal size, and F-field indicating whether further fields are present in the header, wherein the N-field is set to zero (0) and the F-field indicates there are no further frames in the header.

13. The base station arrangement according to claim 12, wherein the payload only comprises specific control data in the form of a MAC-hs specific control data PDU.

14. The base station arrangement according to claim 12, wherein the payload only comprises padding.

15. The base station arrangement according to claim 1, wherein the protocol comprises the MAC-hs protocol of HSDPA.

16. The base station arrangement according to claim 15, wherein the protocol data unit comprises a MAC-hs PDU comprising a MAC-hs header and a MAC-hs payload.

17. A mobile user station supporting High Speed Downlink Packet Access (HSDPA) communication, comprising:
 a mobile user station protocol entity for a protocol for communication with a base station arrangement, wherein the protocol handles high speed control signalling for high speed data communication, said protocol entity comprising control channel message decoding means for decoding control channel messages from the base station arrangement;

a hybrid automatic retransmission mechanism comprising a number of processes in communication with reordering handling means with a number of reordering buffers configured to route over the protocol, received protocol data units to the appropriate buffer based on a queue identity to reorder protocol data units in an appropriate sequence;

quality handling means; and an automatic repeat requesting functionality;

wherein the mobile user station protocol entity comprises a control plane entity supporting an extended or adapted control plane for control plane signaling, comprising specific control message handling means for handling specific probing or information control messages from a base station arrangement;

wherein a specific information control message indication is provided in a header of a protocol data unit of the high speed protocol, and the specific control message is provided in the payload of said protocol data unit, wherein the protocol data unit originates in a MAC-hs layer; and wherein the specific probing or information control message indication is provided by means of a size index identifying field of the packet data unit header, and the analyzing means is configured to analyze the protocol data unit header before or after the received protocol data unit has been appropriately reordered in the reordering means depending on queue identity.

18. The mobile user station according to claim 17, further comprising feedback providing means configured to act also as means for generating a direct or indirect reaction to a received specific probing or information control message.

19. The mobile user station according to claim 17, wherein the header further comprises a queue identifying field, and an identity given in said queue identifying field indicates a specific data packet queue to which the specific probing or information control message refers, and the analyzing means is further configured to determine the affected queue identity and to interpret the specific probing or information control message.

20. The mobile user station according to claim 17, wherein the header of the protocol data unit comprises a version flag field set to zero (0), and the header contains one set only of size identifying field (SID), N-field identifying a number of consecutive packet data units with equal size, and F-field indicating whether further fields are present in the header, wherein the N-field is set to zero (0) and the F-field indicates there are no further frames in the header, and wherein the payload only comprises specific control data in the form of a MAC-hs specific control data PDU or that the payload only comprises padding.

21. The mobile user station according to claim 17, wherein the mobile user station is configured to handle MAC-hs PDUs comprising said specific probing or information control message.

22. A mobile user station supporting High Speed Downlink Packet Access (HSDPA) communication, comprising:

a mobile user station protocol entity for a protocol for communication with a base station arrangement, wherein the protocol handles high speed control signalling for high speed data communication, said protocol entity comprising control channel message decoding means for decoding control channel messages from the base station arrangement;

a hybrid automatic retransmission mechanism comprising a number of processes in communication with reordering handling means with a number of reordering buffers configured to route over the protocol, received protocol data units to the appropriate buffer based on a queue identity to reorder protocol data units in an appropriate sequence;

quality handling means; and an automatic repeat requesting functionality;

wherein the mobile user station protocol entity comprises a control plane entity supporting an extended or adapted control plane for control plane signaling, comprising specific control message handling means for handling specific probing or information control messages from a base station arrangement;

wherein a specific information control message indication is provided in a header of a protocol data unit of the high speed protocol, and the specific control message is provided in the payload of said protocol data unit, wherein the protocol data unit originates in a MAC-hs layer;

wherein the specific control message handling means comprises analyzing means for analyzing a protocol data unit received from a base station and for establishing whether it comprises or contains a specific probing or information control message, wherein the analyzing means is configured to determine of which of a number of different types the specific probing or information control message consists; and wherein the specific probing or information control message comprises a statistic reset message, and the analyzing means is configured to fetch received statistic information and to transmit such information to the base station arrangement and to reset a receive statistic functionality.

23. The mobile user station according to claim 22, wherein the analyzing means is configured to interpret the specific probing or information control message.

24. The mobile user station according to claim 22, wherein the specific probing or information control message comprises a probing message in the form of a null data message, and in that the analyzing means is configured to discard the null data message.

25. The mobile user station according to claim 22, wherein the specific probing or information control message comprises a status request message or a reset message, wherein the analyzing means is configured to reset the protocol entity.

* * * * *